(12) United States Patent
Burns et al.

(10) Patent No.: US 12,531,965 B1
(45) Date of Patent: Jan. 20, 2026

(54) AUDIO / VISUAL (A/V) DEVICE

(71) Applicant: Amazon Technologies, Inc., Seattle, WA (US)

(72) Inventors: Thomas Burns, Patchogue, NY (US); Michael James O'Connor, Charlestown, MA (US); David Wai-Man Wong, Somerville, MA (US); Jonathan E. Cohn, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 18/074,098

(22) Filed: Dec. 2, 2022

(51) Int. Cl.
| | |
|---|---|
| *H04N 23/54* | (2023.01) |
| *H04N 7/18* | (2006.01) |
| *H04N 23/51* | (2023.01) |
| *H04N 23/55* | (2023.01) |
| *H04R 1/04* | (2006.01) |

(52) U.S. Cl.
CPC ............. *H04N 7/183* (2013.01); *H04N 23/51* (2023.01); *H04N 23/54* (2023.01); *H04N 23/55* (2023.01); *H04R 1/04* (2013.01)

(58) Field of Classification Search
CPC ........ H04N 7/183; H04N 23/51; H04N 23/54; H04N 23/55; H04R 1/04
See application file for complete search history.

(56) References Cited

U.S. PATENT DOCUMENTS

| | | | | |
|---|---|---|---|---|
| 9,674,965 B1 * | 6/2017 | Salinger | ............... | H05K 5/0086 |
| 11,640,108 B1 * | 5/2023 | O'Connor | ............. | H04R 1/028 |
| | | | | 396/429 |
| 2017/0131594 A1 * | 5/2017 | Nakada | ................. | G06F 3/0443 |
| 2018/0102123 A1 * | 4/2018 | Tisch | ..................... | H04R 3/005 |
| 2018/0113566 A1 * | 4/2018 | Shigemori | ........... | G02F 1/1368 |
| 2022/0408170 A1 * | 12/2022 | Park | ........................ | H04R 1/04 |

FOREIGN PATENT DOCUMENTS

| | | | |
|---|---|---|---|
| CN | 108551574 | * | 6/2018 |
| CN | 213604733 | * | 11/2020 |
| DE | 202020100912 | * | 2/2020 |

OTHER PUBLICATIONS

Kuhnen translation of DE 202020100912 Feb. 19, 2020 (Year: 2020).*
LI translation of CN 108551574 Jun. 25, 2018 (Year: 2018).*
Peng translation of CN 213604733 Nov. 20, 2020 (Year: 2020).*

* cited by examiner

*Primary Examiner* — Zaihan Jiang
(74) *Attorney, Agent, or Firm* — Eversheds Sutherland (US) LLP

(57) ABSTRACT

A device includes a housing, a first cover coupled to the housing, a second cover coupled to the housing, and a microphone assembly. The first cover includes a first channel. The microphone assembly includes a printed circuit board (PCB) having a microphone and a second channel, and a seal. The seal has a third channel configured to align with the first channel and the second channel, and a cavity. The seal is configured to transition between an unfolded state in which the PCB is insertable into the cavity, and a folded state in which the PCB is at least partially enclosed within the cavity and the microphone is enclosed within the cavity.

25 Claims, 33 Drawing Sheets

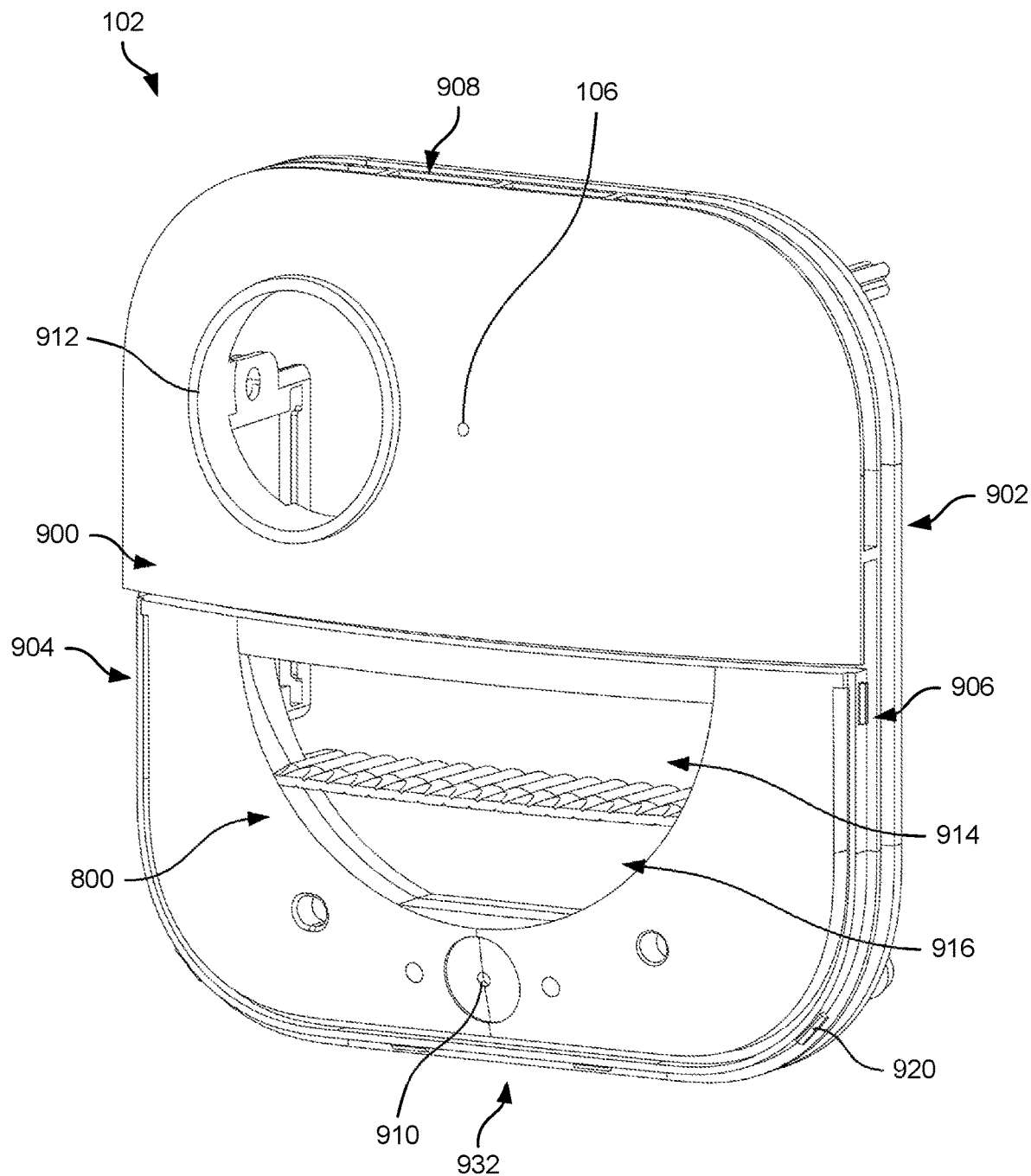
FIG. 9A
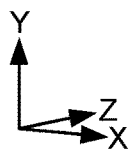

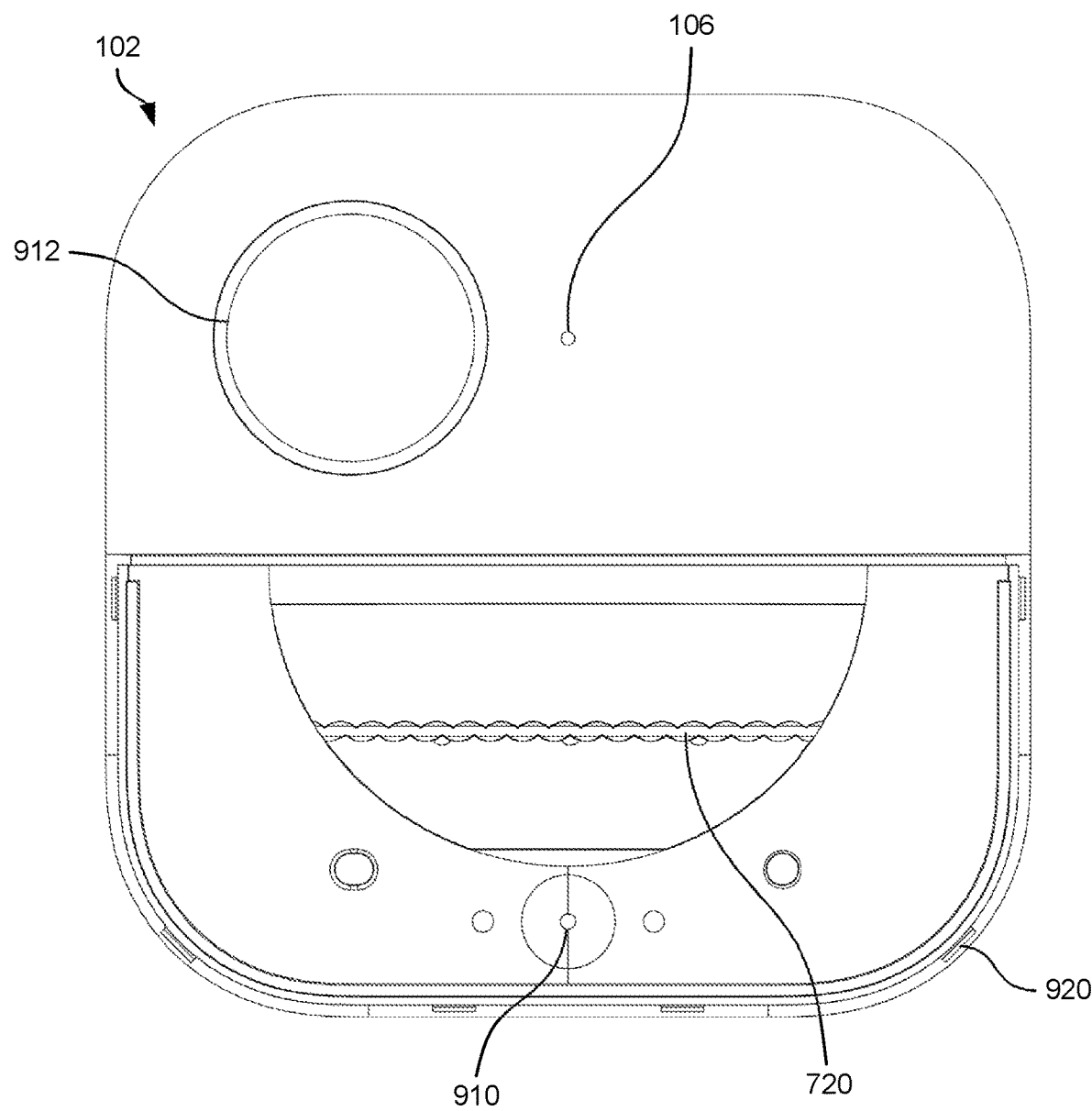
FIG. 9C
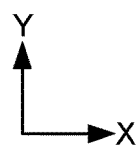

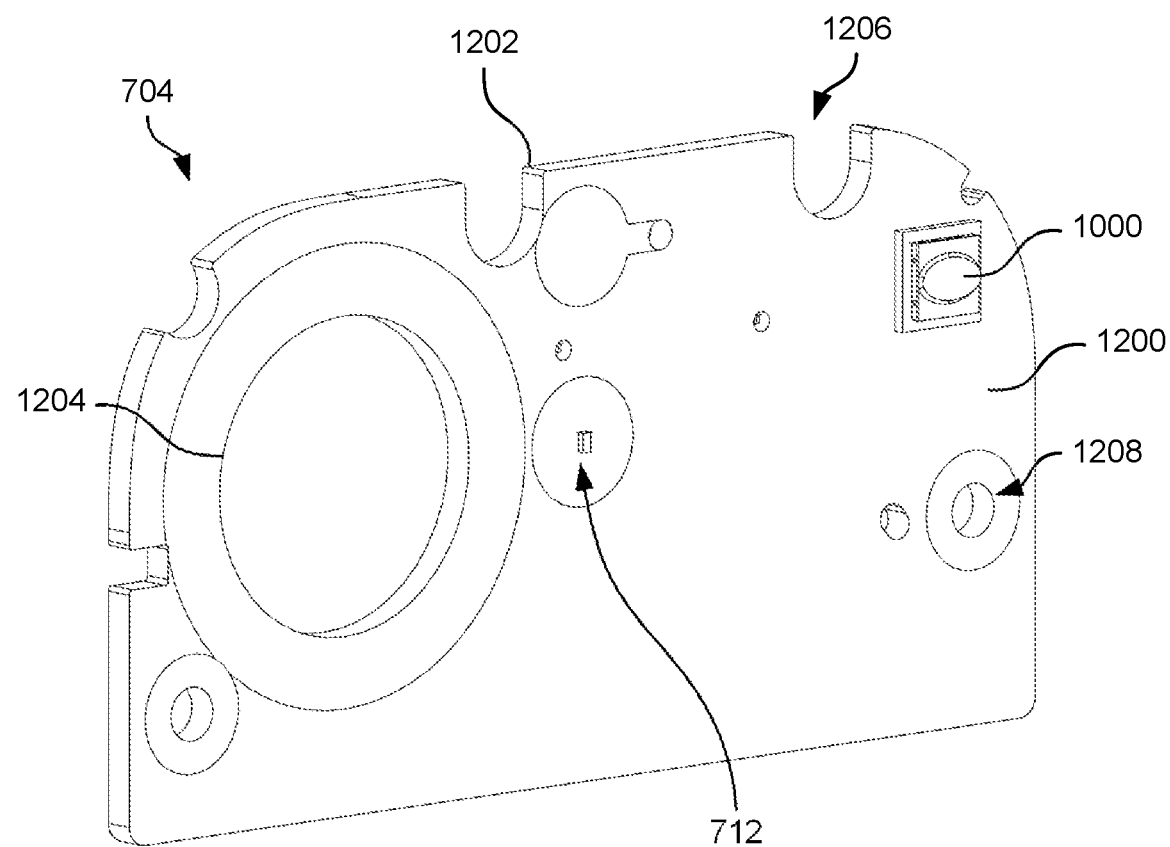
FIG. 12
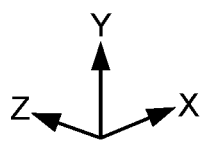

AUDIO / VISUAL (A/V) DEVICE

BACKGROUND

Security is a concern for many homeowners, businesses, and the like. In some examples, those seeking to protect or monitor their homes or place of business may wish to have video and audio communications. Devices, for example, may be placed adjacent to an external door or entryway. However, conventional devices may be unaesthetically appealing, have large form factors, and/or have suboptimal audio and/or video characteristics.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The devices and systems depicted in the accompanying figures are not to scale and components within the figures may be depicted not to scale with each other.

FIGS. 9A-9C illustrate a front cover of the device of FIG. 1, according to an example of the present disclosure.

FIG. 12 illustrates an example printed circuit board (PCB) of the device of FIG. 1, according to an example of the present disclosure.

DETAILED DESCRIPTION

Figure 1:
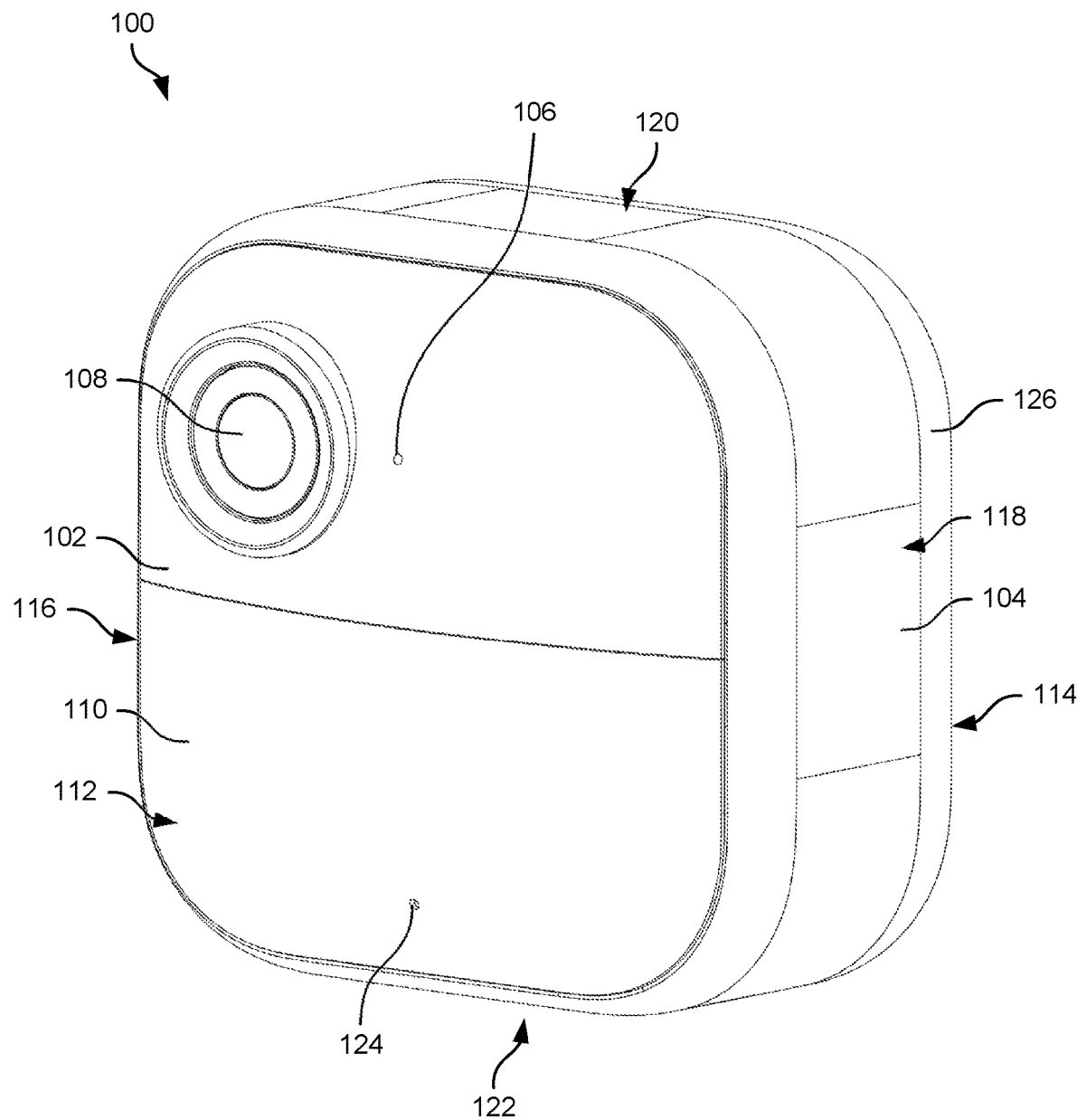
FIG. 1 illustrates a front perspective view of an example device, according to an example of the present disclosure.

This application is directed, at least in part, to a device having improved motion sensing and audio capturing abilities. In some instances, the device includes a housing, a front cover coupled to the housing, and a rear cover coupled to the housing, opposite the front housing. A camera may be oriented to capture images and/or video in front of the device, and passive infrared (PIR) sensor(s) may be arranged to detect motion in front of the device. A sensor window, transmissive to light rays, couples to the front cover and directs light rays (e.g., radiation) towards the PIR sensor(s) for motion sensing. A microphone assembly resides within the device and receives audio at least partially from channels disposed through the front cover and the sensor lens. In some instances, the microphone assembly includes a microphone that is encased (e.g., enclosed) within a microphone seal to acoustically isolate the microphone. The microphone seal may further assist in channeling sound to the microphone. The arrangement of the PIR sensor(s) on/within the device, as well as the acoustic isolation of the microphone, permits the device to more accurately capture motion and audio with an environment, respectively.

In some instances, the front cover defines a window having an upper portion (e.g., section) and a lower portion (e.g., section). A divider of the front cover may be disposed between the upper portion and the lower portion, so as to separate the upper portion and the lower portion. The sensor lens may couple to the front cover and be transmissive to light rays (e.g., radiation) for the PIR sensor(s). For example, a first PIR sensor may receive first light rays via the upper portion of the window, while a second PIR sensor may receive second light rays via the lower portion of the window. The divider disposed between the upper portion and the lower portion may prevent light rays received by the first PIR sensor interfering (e.g., cancelling out) light rays received by the second PIR sensor. In some instances, the divider may also include scalloped-shaped features to reduce a glare or reflection of the incoming light rays.

In some instances, the PIR sensor(s) may be in a vertically stacked relationship compared to one another. For example, the first PIR sensor may reside vertically above the second PIR sensor. In some instances, the PIR sensor(s) are vertically aligned, such as along a vertical axis extending through a center of the device. The sensor lens, or a portion thereof, may include a Fresnel lens for directing incoming light rays to the first PIR sensor and the second PIR sensor, respectively. In some instances, the Fresnel lens is made up of a plurality of individual lens elements having respective focal lengths, concentric grooves, and so forth.

The microphone assembly may couple to the front cover, and the microphone of the microphone assembly is oriented to receive sound from in front of the device. In some instances, the microphone is mounted to a microphone printed circuit board (PCB) disposed within the microphone seal. The microphone PCB may include a channel that directs sound to the microphone. Additionally, the front cover, the sensor lens, and the microphone seal may define channels that direct sound to the microphone. For example, the channels of the sensor lens, front cover, microphone seal, and the microphone PCB may align to direct sound to the microphone.

The microphone seal defines a cavity within which the microphone resides. In some instances, the microphone seal may fold around the microphone to form the cavity in which the microphone resides. For example, the microphone seal may fold from an unfolded state to a folded state in which the microphone seal encapsulates the microphone. In the unfolded state, the microphone (and the microphone PCB) may be placed within the microphone seal. Thereafter, the microphone seal may be folded around microphone (and the microphone PCB). For example, a first portion of the microphone seal and a second portion of the microphone seal may be hingedly coupled to one another. After placement of the microphone PCB within the microphone seal, the first portion and the second portion may be folded together to enclose the microphone within the microphone seal. Fasteners, and/or other coupling mechanisms (e.g., adhesives) may couple the microphone assembly to the front cover. In some instances, the microphone seal may be manufactured from a flexible or semi-rigid material (e.g., silicon, silicone, rubber, etc.) in order to fold around and encapsulate the microphone. In accordance with one or more preferred implementations, such a flexible or foldable microphone seal is utilized to facilitate manufacturing of an electronic device.

The device may also include an IR sensor oriented to emit IR signals through a portion of the front cover. The IR sensor emits signals (e.g., IR signals) through at least a portion of the front cover and receives the signals to detect IR radiation. As such, at least a portion of the front cover is transmissive to signals emitted from, and received by, the IR sensor. Additionally, the device may include a status indicator (e.g., light emitting diode (LED)) that outputs light indicative of an operational status of the device. In some instances, the light output by the status indicator may indicate whether the camera is recording, whether motion was detected, whether the microphone is recording audio, etc. In some instances, the status indicator may illuminate to different colors of light, different patterns of light, and so forth depending on the operational state of the device.

A speaker is oriented to emit sound outward from the device. In some instances, the speaker is disposed within the housing. In some instances, the speaker is oriented to emit sound outward from a side of the device. The speaker may include any suitable speaker, such as a tweeter, mid-range, or subwoofer.

The rear cover may provide access to an interior of the device. For example, the rear cover may be decoupled from the housing via a fastening mechanism that secures the rear cover to the housing. Removing the rear cover may expose batteries of the device, which may be interchangeable and/or recharged. Additionally, the rear cover may include a pressure relief vent to vent air within the device (e.g., during a coupling of the rear cover to the housing) and/or while components of the device generate heat. The rear cover may also include a port that is capable of receiving a wire, cable, and the like (e.g., power cable, auxiliary, ethernet, etc.).

In addition to the microphone PCB, the device may include additional PCBs or printed circuit board assemblies (PCBAs) disposed within the housing. The camera, speaker, status indicator, IR sensor, and PIR sensors may be mounted or otherwise coupled to the PCBs. Network interfaces (e.g., antenna(s)) wirelessly couple the device to one or more remote devices (e.g., mobile device, laptop, etc.) over one or more networks (e.g., Cellular, Wi-Fi, BLE, Bluetooth, etc.). The PCBs, as well as other computing components of the device, may be communicatively coupled to one another via one or more flex circuits, wires, connectors, and so forth.

The housing may include cutouts, apertures, recesses, and the like for accommodating or otherwise receiving the front cover and the rear cover. Additionally, the front cover may include cutouts, apertures, recesses, and the like for receiving the sensor lens. The housing may additionally or alternatively include various frames, mounts, and brackets for receiving components of the device, or to which components of the device couple. The housing, front cover, rear cover, and/or sensor lens may also include various alignment mechanisms, such as tabs, pins, slits, and so forth for aligning components within the device. The front cover, housing, and/or rear cover may also couple to one another using various seals, gaskets, and so forth to environmentally seal the device.

In some instances, a mount may couple to the device to dispose the device on a vertical surface (e.g., wall) or a horizontal surface (e.g., shelf). In some instances, the mount may couple to the rear cover and may be removably coupled to the rear cover depending upon the configuration desired. For example, the device may rest (e.g., sit) on a horizontal surface without the mount. When the mount couples to the rear cover and the vertical surface, the device may hang.

The device may also include heat dissipating elements to disperse heat generated by components of the device. By way of example and not limitation, the camera(s), LEDs, power supply, network interfaces, and so forth generate heat during use. Without effectively dispersing or dissipating this heat, the internal components, such as the camera, may be adversely affected and become uncappable of performing its intended function. To efficiently dissipate heat generated by the components, heat dissipating elements may be included within the housing to transmit heat away from generating sources toward an exterior of the device. The pressure relief vent may also assist in dissipating heat accumulated with the device.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a front perspective view of an example device 100, according to examples of the present disclosure. In some instances, the device 100 may represent an electronic device, audio/video (A/V) device, and so forth configured to capture audio and/or video within an environment of the device 100. In some instances, the device 100 includes a front cover 102 coupled to a housing 104. The front cover 102 may include a channel 106 through which light is emitted. A light emitting element of the device 100, for example, may be configured to emit light out of the channel 106. As explained herein, a light pipe may reside within the channel 106 to assist in directing light from the light emitting element, internal to the device 100, to an exterior of the device 100.

The device 100 may also include a camera lens 108 coupled to or disposed within the front cover 102. As will be explained herein, a camera of the device 100 is disposed behind (e.g., Z-direction) the camera lens 108 for imaging an environment of the device 100. The device 100 further includes a sensor lens 110, which in some instances, couples to the front cover 102. As will be explained herein, sensor(s) may be disposed behind (e.g., Z-direction) the sensor lens 110 for sensing the environment. In some instances, the sensor(s) disposed beneath the sensor lens 110 are configured to detect motion within the environment, and in response, the camera of the device 100 may capture and/or record image data/video data. In some instances, the sensor(s) are infrared (IR) sensor(s), passive IR sensor(s), and so forth). Additionally, the sensor lens 110 may include a channel 124 through which sound is configured to pass for reaching a microphone disposed within the device 100.

In some instances, the device 100 includes a front 112, a back 114 opposite the front 112 (e.g., spaced apart in the Z-direction), a first side 116, a second side 118 opposite the first side 116 (e.g., spaced apart in the X-direction), a top 120, and a bottom 122 opposite the top 120 (e.g., spaced apart in the Y-direction). The front cover 102 and the sensor lens 110 may be disposed along the front 112, and may define a portion of an exterior surface of the device 100. The housing 104 may be disposed along the first side 116, the second side, the top 120, and/or the bottom 122. A rear cover 126 couples to the housing 104, at the back 114.

In some instances, the camera is oriented towards the front 112 of the device 100. Additionally, the camera may be located more proximate to the first side 116 than the second side 118, and/or the top 120 than the bottom 122. In some instances, the channel 106 is located centrally between the first side 116 and the second side 118, and/or may be located more proximate to the top 120 than the bottom 122. In some instances, the channel 124 is located centrally between the first side 116 and the second side 118, and/or may be located more proximate to the bottom 122 than the top 120. The channel 106 and the channel 124 are shown being located on the front 112 of the device 100.

Figure 2:
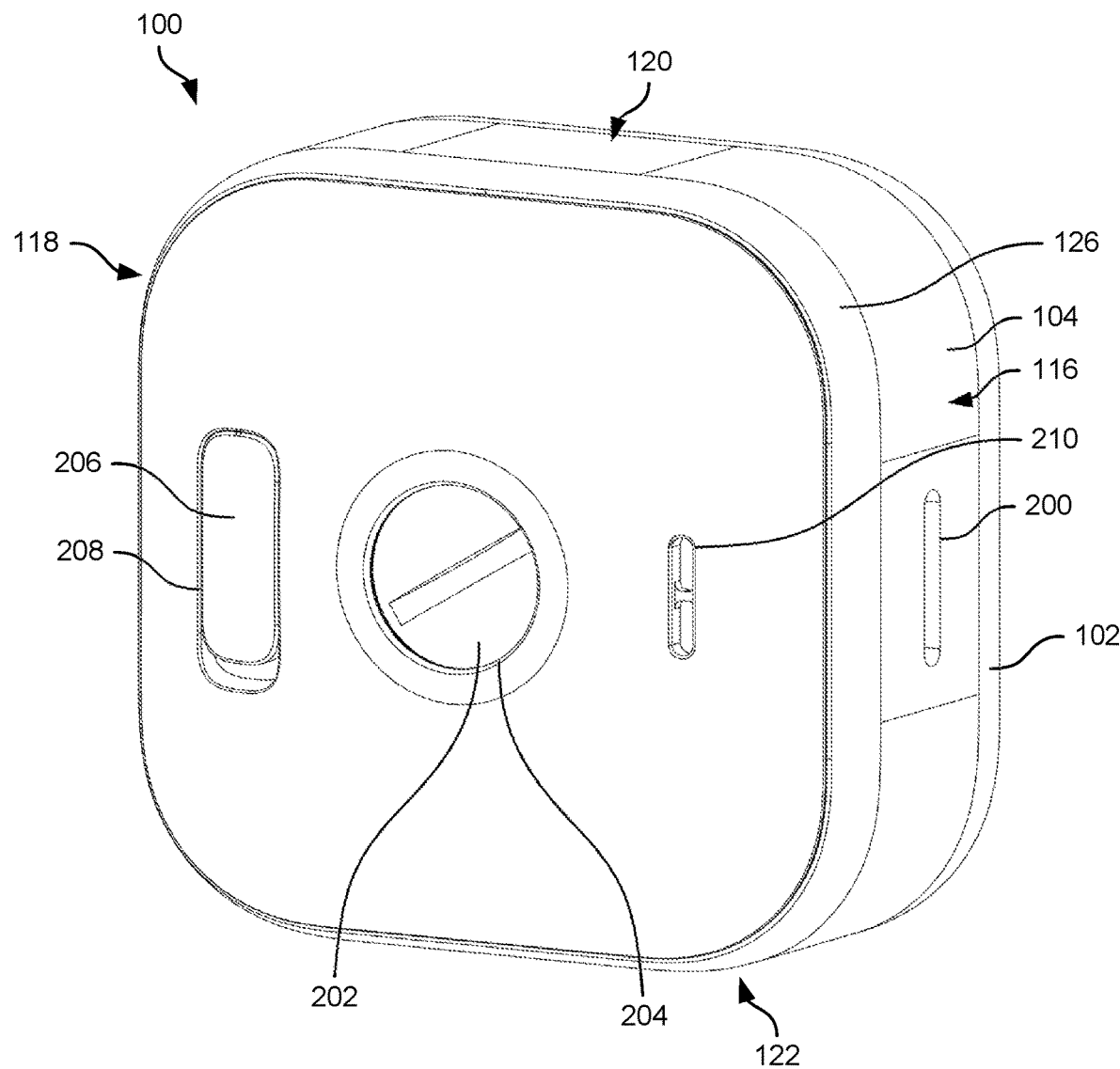
FIG. 2 illustrates a rear perspective view of the device of FIG. 1, according to an example of the present disclosure.

FIG. 2 illustrates a rear perspective view of the device 100, according to examples of the present disclosure. In some instances, the housing 104 of the device 100 includes an orifice 200 disposed along the first side 116 of the device 100. As will be explained herein, a speaker may reside beneath the orifice 200 (e.g., in the X-direction) and may be oriented to emit sound towards the orifice 200.

The device 100 includes the rear cover 126 that couples to the housing 104. For example, the front cover 102 may couple to a first side of the housing 104 (at/proximate to the front 112) and the rear cover 126 may couple to a second side of the housing 104 (at/proximate to the back 114). The rear cover 126 may include a fastening mechanism 202 that couples the rear cover 126 to the housing 104. In some instances, the fastening mechanism 202 mechanism resembles a fastener (e.g., screw) that threads into the housing 104 for coupling the rear cover 126 to the housing 104. The rear cover 126 may define a first receptacle 204 into which the fastening mechanism 202 is received. Furthermore, in some instances, a mount may be disposed within the first receptacle 204, and couple to the first receptacle 204 and/or the fastening mechanism 202 (e.g., screw head). The mount may be used to dispose the device 100 on a vertical surface (e.g., wall) and/or a horizontal surface (e.g., shelf). In some instances, the engagement between the mount and the first receptacle 204 may resemble a snap-fit or compression fit coupling. For example, portions of the mount may engage with sidewalls of the first receptacle 204.

The rear cover 126 may also include a plug 206 that resides within a second receptacle 208. The plug 206 may be disposed over (e.g., in the Z-direction) an input port of the device 100 used to communicatively couple the device 100 to one or more additional devices and/or charging the device 100. For example, removing the plug 206 may expose the input port (e.g., ethernet, power, auxiliary, USB-C, etc.). A cable may plug into the input port for charging batteries of the device 100, connecting the device 100 to one or more networks, and so forth.

The rear cover 126 may further include a pressure relief vent 210. When assembled together, such as when the fastening mechanism 202 is tightened, air within the device 100 may be vented through the pressure relief vent 210. In some instances, one or more membranes may be disposed within the rear cover 126 and/or the housing 104 to permit the ingress of liquid or other debris through the pressure relief vent 210.

In some instances, the fastening mechanism 202 (and/or the first receptacle 204) is centrally located on the rear cover 126, between the first side 116 and the second side 118, and/or between the top 120 and the bottom 122. Additionally, in some instances, the plug 206 (and/or the second receptacle 208) may be located more proximate to the second side 118, while the pressure relief vent 210 may be located more proximate to the first side 116. In some instances, the fastening mechanism 202, plug 206, and/or pressure relief vent 210 may be horizontally aligned (e.g., on the X-plane). The orifice 200, disposed at the first side 116, may additionally or alternatively be aligned with the fastening mechanism 202, plug 206, and/or pressure relief vent 210.

Figure 3:
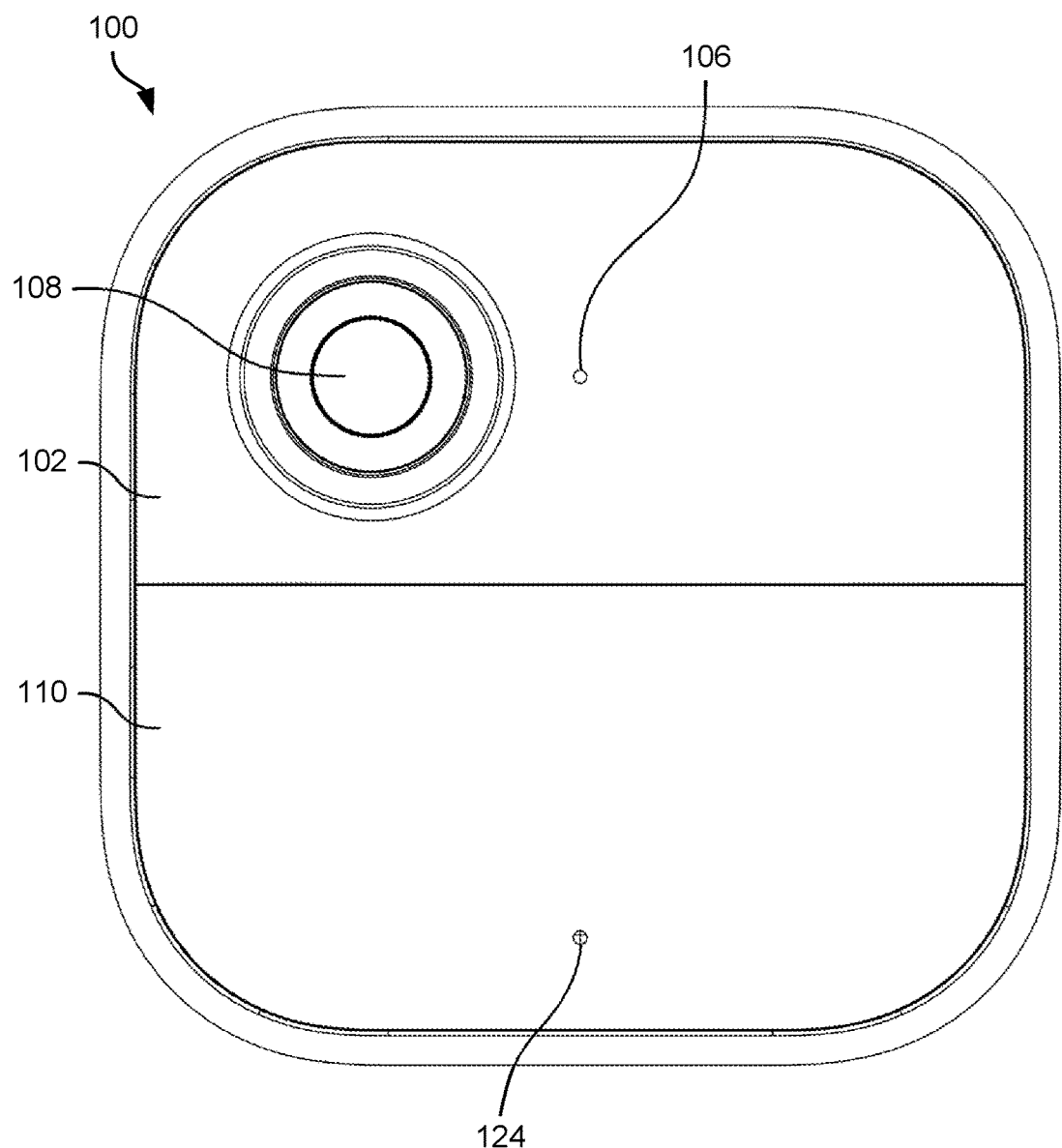
FIG. 3 illustrates a front view of the device of FIG. 1, according to an example of the present disclosure.

FIG. 3 illustrates a front view of the device 100, according to examples of the present disclosure. Introduced above, the front cover 102 may define the channel 106 for emitting light associated with an operation being performed by the device 100 (e.g., recording audio, recording video, detecting motion, etc.). The sensor lens 110 defines the channel 124 through which sound at least partially travels for reaching one or more microphone(s) disposed within the device 100. In some instances, the channel 106 and the channel 124 are vertically aligned. The camera lens 108 is further shown coupled to the front cover 102. As will be explained herein, the front cover 102 may define a receptacle within which the camera lens 108 (and/or the camera) is at least partially disposed, or within which the camera lens 108 resides.

In some instances, the front cover 102 and/or the sensor lens 110 are transmissive to signals and/or light rays. For example, in some instances, IR sensor(s) may reside beneath the front cover 102 and are oriented to emit IR signals in front of the device 100 for detecting motion. PIR sensor(s) may reside beneath the sensor lens 110, and are configured to receive light rays (e.g., radiation) emitted from sources (e.g., people, animals, etc.). In some instances, the front cover 102 and the sensor lens 110 are manufactured from different materials, or the same materials. Example materials include, for example, from high-density polyethylene (HDPE), silicon, germanium, zinc-sulfide, or zinc-selenide, and so forth.

Figure 4:
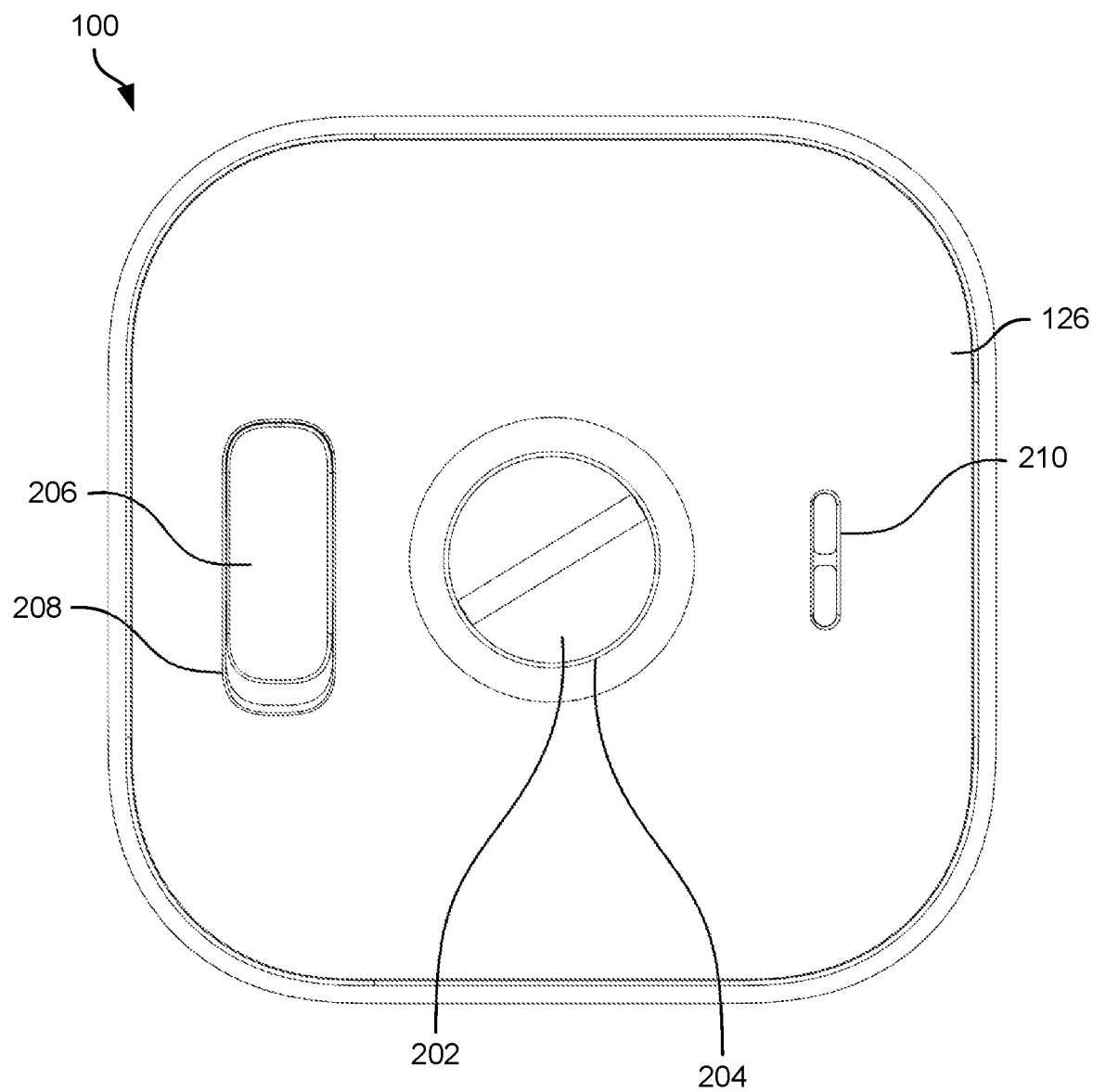
FIG. 4 illustrates a rear view of the device of FIG. 1, according to an example of the present disclosure.

FIG. 4 illustrates a rear view of the device 100, according to examples of the present disclosure. The rear cover 126 includes the fastening mechanism 202, the plug 206, the pressure relief vent 210, as well as the first receptacle 204 and the second receptacle 208. In some instances, the device 100 may include a substantially square-shape (e.g., in the X-Y plane), however, other shapes are envisioned (e.g., rectangular, hexagonal, etc.).

Figure 5A:
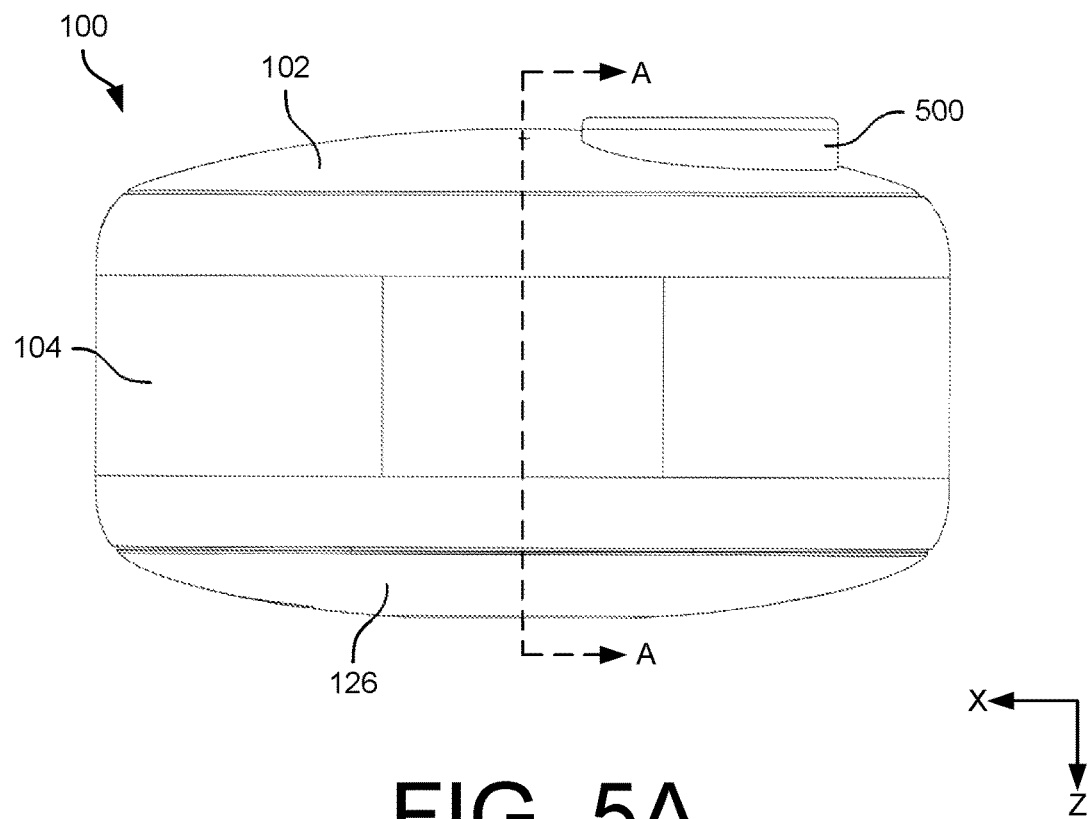
FIG. 5A illustrates a top view of the device of FIG. 1, according to an example of the present disclosure.
Figure 5B:
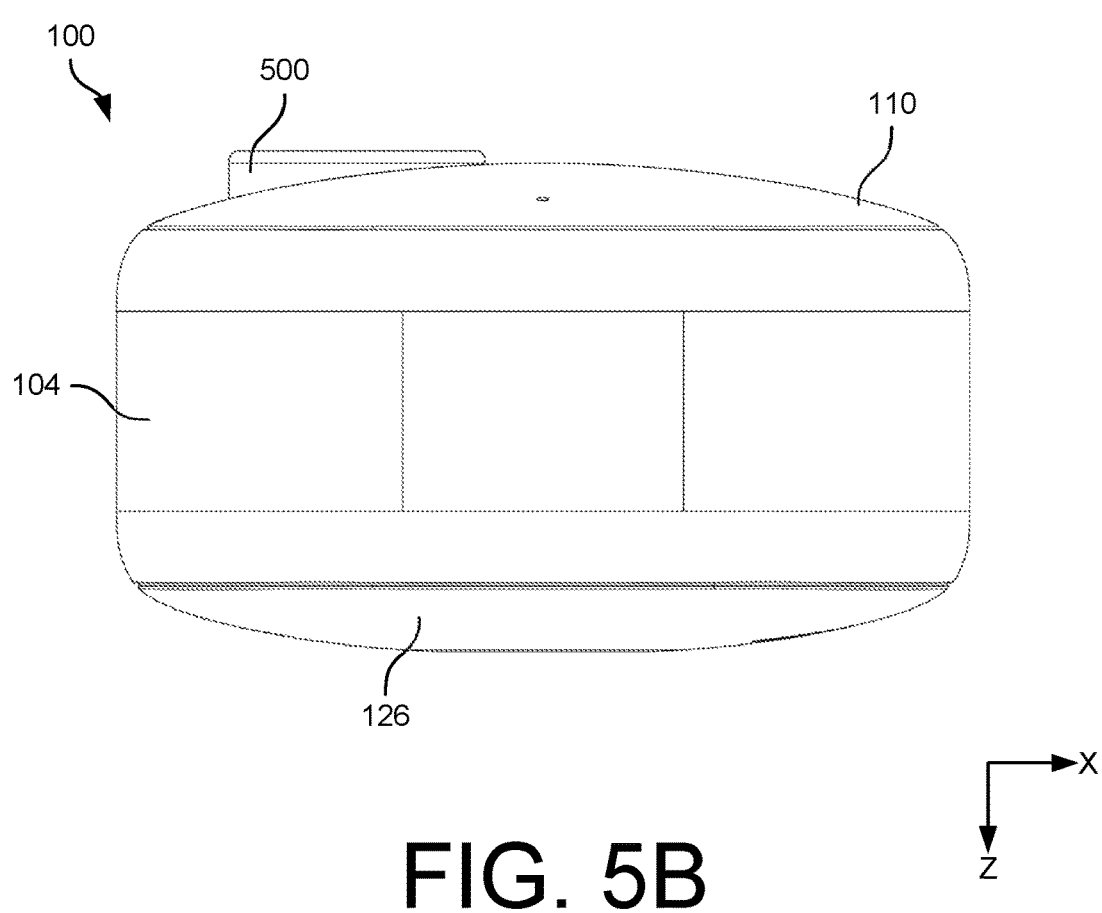
FIG. 5B illustrates a bottom view of the device of FIG. 1, according to an example of the present disclosure.

FIGS. 5A and 5B illustrate end views of the device 100, according to examples of the present disclosure. FIG. 5A illustrates a top view of the device 100, while FIG. 5B illustrates a bottom view of the device 100. The front cover 102 is shown coupled to a first side of the housing 104 and the rear cover 126 is shown coupled to second side of the housing 104 opposite the first side of the housing 104 (e.g., spaced apart in the Z-direction). In some instances, seals gaskets, and so forth may be interposed between the front cover 102 and the housing 104, and/or the rear cover 126 and the housing 104 to environmentally seal the device 100.

In some instances, an exterior surface of the device 100 formed by the front cover 102, the housing 104, and the rear cover 126 is substantially uniform around the device 100. The camera lens 108 may reside within a projection 500 that extends from the front cover 102. The projection 500 is shown extending (e.g., proud of) the exterior surface of the device 100. The projection 500 may orient the camera within the device 100, or the camera lens 108 normal to the camera.

Figure 6A:
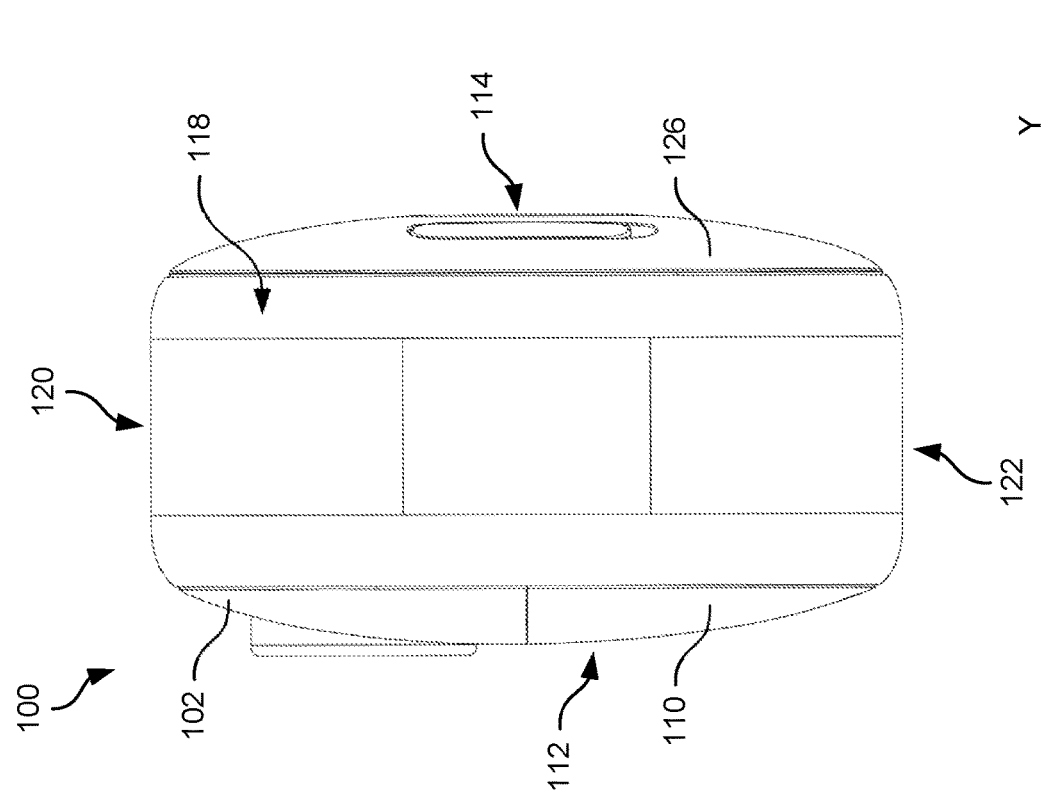
FIG. 6A illustrates a first side view of the device of FIG. 1, according to an example of the present disclosure.
Figure 6B:
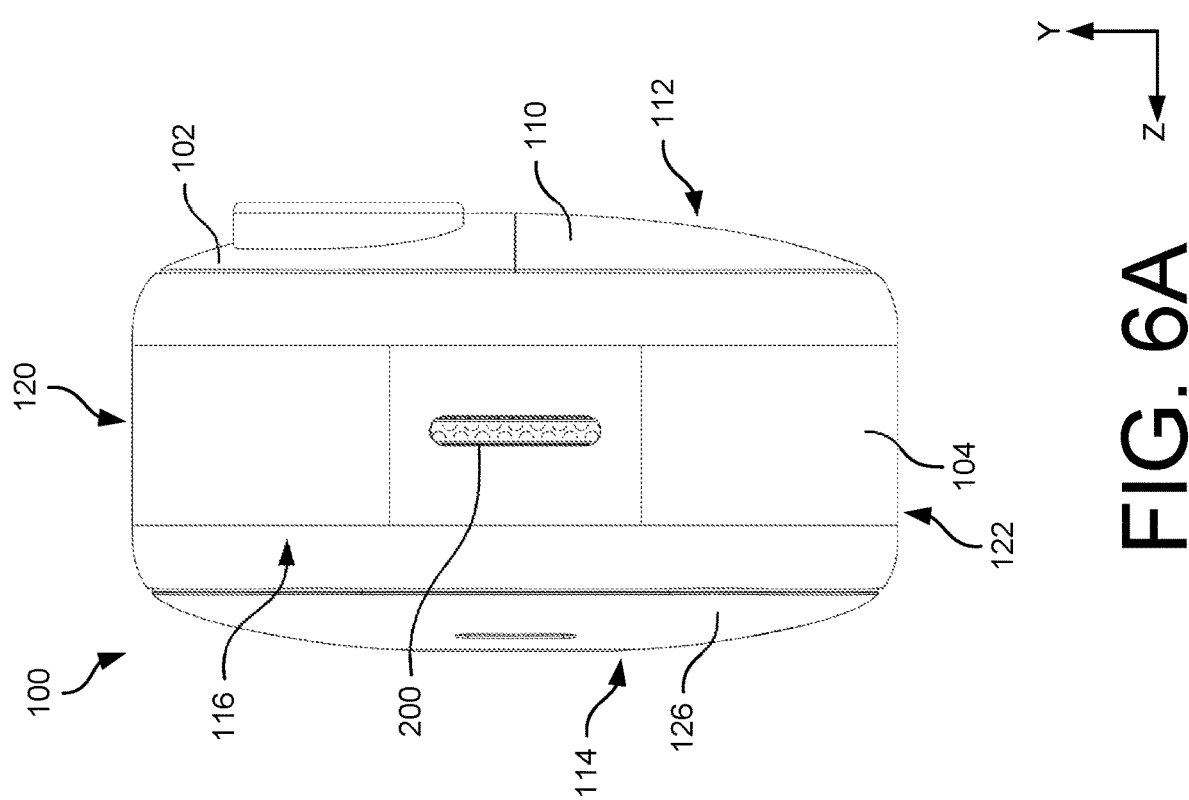
FIG. 6B illustrates a second side view of the device of FIG. 1, according to an example of the present disclosure.

FIGS. 6A and 6B illustrate side views of the device 100, according to examples of the present disclosure. FIG. 6A illustrates a view of the first side 116 of the device 100, while FIG. 6B illustrates a view of the second side 118 of the device 100. The orifice 200 is shown located through the housing 104 on the first side 116. A speaker of the device 100 resides within the housing 104 and is oriented to emit sound outward from the device via the orifice 200. In some instances, the orifice 200 is centrally located on the housing 104, such as between the top 120 and the bottom 122, and/or between the front 112 and the back 114. As also shown, the front cover 102 and the rear cover 126 couple to the housing 104.

Figure 7:
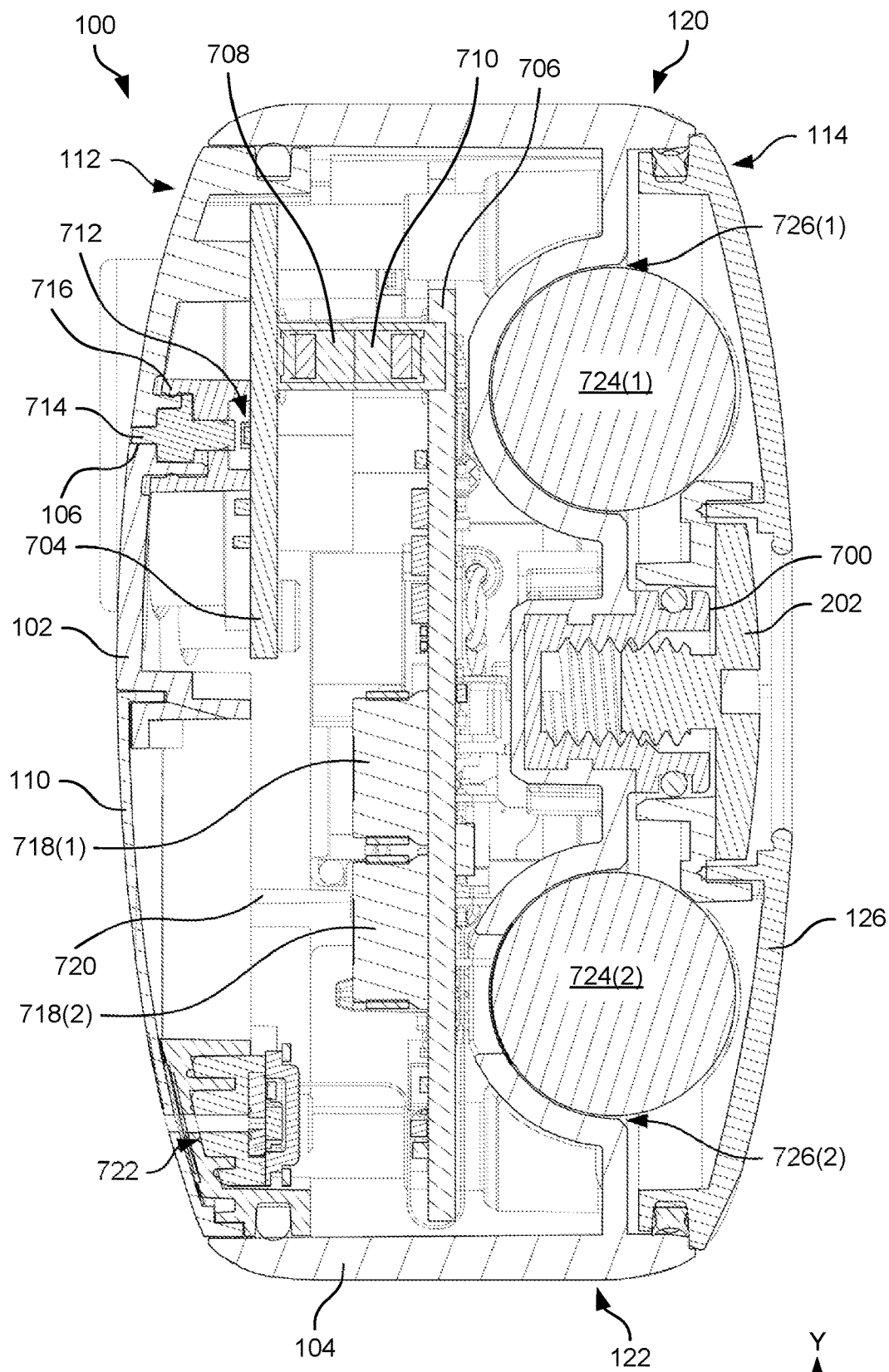
FIG. 7 illustrates a cross-sectional view of the device of FIG. 1, taken along line A-A of FIG. 5A, according to an example of the present disclosure.

FIG. 7 illustrates a cross-sectional view of the device 100, taken along line A-A of FIG. 5A, according to examples of the present disclosure. The front cover 102 couples to the housing 104, at/proximate to the front 112 of the device 100, while the rear cover 126 couples to the housing 104 at/proximate to the back 114. As shown, the rear cover 126 may couple to the housing 104 via the fastening mechanism 202 being secured within a receptacle 700 of the housing 104 (e.g., threaded). In some instances, the front cover 102 couples to the housing 104 via snap-fits, compression-fits, and/or fasteners. Additionally, the sensor lens 110 may couple to the front cover 102 via snap-fits, compression-fits, and/or fasteners.

The device 100 may include a first printed circuit board 704 (PCB) and a second PCB 706. In some instances, the first PCB 704 and the second PCB 706 are communicatively coupled to one another via a first connector 708 of the first PCB 704 and a second connector 710 of the second PCB 706, respectively. Various other connectors (e.g., flex circuits) may couple the first PCB 704 and the second PCB 706. In some instances, the first PCB 704 may be disposed more proximate to the front 112 of the device 100 than the second PCB 706. Among other components, the first PCB 704 may include a lighting element 712 configured to emit light through a light pipe 714. The light pipe 714 may be at least partially disposed within the channel 106. A gasket 716, for example, may surround at least a portion of the lighting element 712 and/or the light pipe 714 such that the light is directed out the channel 106 and to the exterior of the device 100.

Among other components, the second PCB 706 may include a first PIR sensor 718(1) and a second PIR sensor 718(2). The first PIR sensor 718(1) and the second PIR sensor 718(2) are shown being in a vertically stacked relationship on the second PCB 706. For example, the first PIR sensor 718(1) may be located more proximate to the top 120 of the device 100 than the second PIR sensor 718(2). The first PIR sensor 718(1) and the second PIR sensor 718(2) are arranged to receive light rays through the sensor lens 110. The sensor lens 110 may include a Fresnel lens (or Fresnel lens array) for directing light rays to the first PIR sensor 718(1) and the second PIR sensor 718(2), respectively. As will also be explained herein, the first PIR sensor 718(1) may be arranged vertically above a divider 720 of the front cover 102, and the second PIR sensor 718(2) may be arranged vertically below the divider 720. In doing so, first light rays may be directed to the first PIR sensor 718(1) and second light rays may be directed to the second PIR sensor 718(2).

In some instances, the first PIR sensor 718(1) and the second PIR sensor 718(2) are PIR sensors. In some instances, a PIR sensor may include, for example, two pyroelectric sensing elements and each pyroelectric sensing element has a pyroelectric crystal. The pyroelectric sensing elements generate an electrical charge in response to heat. Radiation (e.g., IR light) received at a surface of a pyroelectric sensing element generates heat, which in turn, generates an electrical charge. Stated alternatively, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

In some instances, the two pyroelectric sensing elements may be electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature).

In some instances, the PIR sensor may include two slots, each providing an optical path to one of the pyroelectric sensing elements. A Fresnel lens formed by or within a portion of the sensor lens 110 is configured to direct light onto the pyroelectric sensing elements. In some instances, such as in the case that the device 100 includes two PIR sensors, the Fresnel lens array is configured to direct light received at a first portion of the sensor lens (e.g., upper half) onto the pyroelectric sensing elements of a first PIR sensor (e.g., the first PIR sensor 718(1)), and to direct light received at a second portion of the sensor lens (e.g., lower half) onto the pyroelectric sensing elements of a second PIR sensor (e.g., second PIR sensor 718(2)). The PIR sensors may be analog, with an analog signal output, or may be digital, with digital data output generated utilizing an analog-to-digital converter (ADC).

In some instances, the device 100 may include the PIR sensors to detect objects. For example, each PIR sensor may output a signal or sensor data, where the device 100 uses a characteristic determined using the signal or sensor data to determine whether the PIR sensor detected an object. The characteristic may include a voltage represented by the signal or sensor data, an amplitude of a wave generated or determined using the signal or sensor data, an angle of the wave generated using the signal or sensor data, and/or the like.

The device 100 may further include a microphone assembly 722. The microphone assembly 722 may be mounted to the front cover 102, and communicatively coupled to the first PCB 704 and/or the second PCB 706. A portion of the microphone assembly 722 is aligned with the channel 124 such that sound may be directed to a microphone of the microphone assembly 722. Various shielding or isolating foams may be disposed around the microphone assembly 722, the front cover 102, the sensor lens 110, and so forth for acoustically sealing the microphone, and/or to prevent the ingress of liquid or other debris into the device 100.

In some instances, the device 100 is powered via a first battery 724(1) and a second battery 724(2). The first battery 724(1) and the second battery 724(2) may be received within a first battery receptacle 726(1) and a second battery receptacle 726(2) defined by the housing 104. Removing the rear cover 126 may expose the first battery 724(1) and the second battery 724(2) for charging or replacement.

Figure 8A:
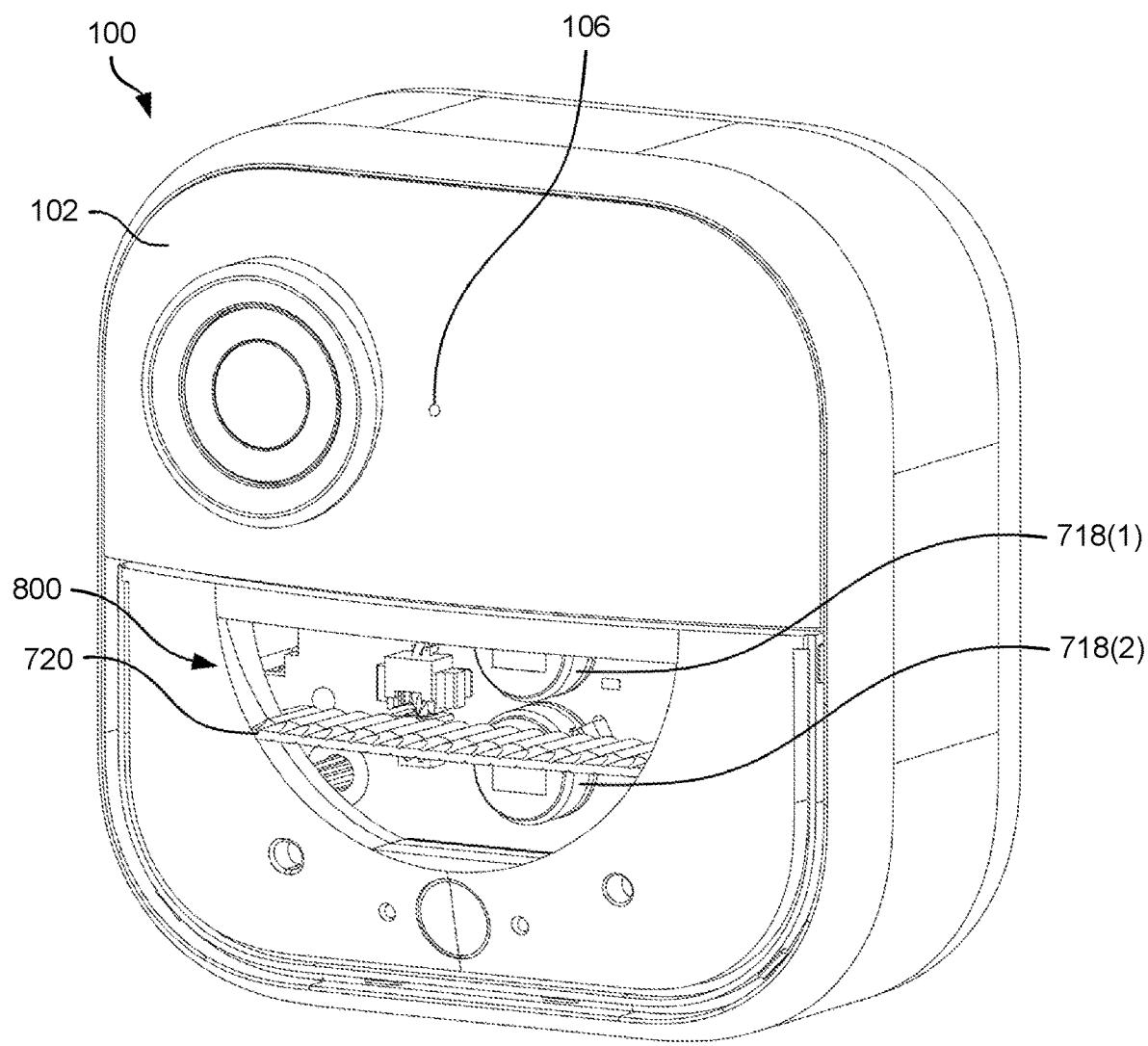
FIGS. 8A and 8B illustrate example sensors of the device of FIG. 1, according to an example of the present disclosure.
Figure 8A:
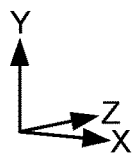
Figure 8B:
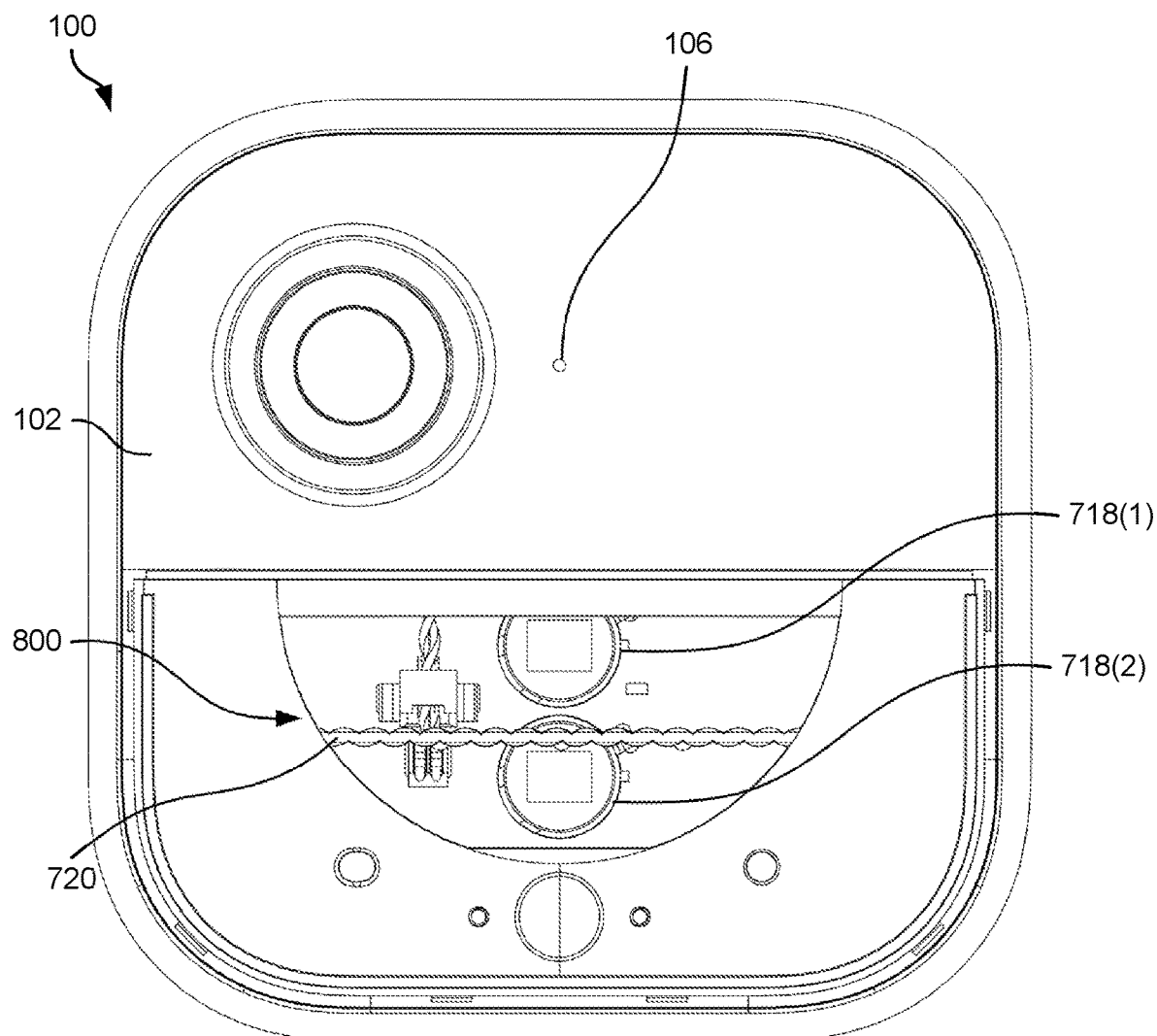
Figure 8B:
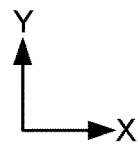

FIGS. 8A and 8B illustrate the first PIR sensor 718(1) and the second PIR sensor 718(2) disposed within the device 100, according to examples of the present disclosure. In FIGS. 8A and 8B, the sensor lens 110 is shown being removed to illustrate the first PIR sensor 718(1) and the second PIR sensor 718(2) residing therebeneath.

The first PIR sensor 718(1) is shown being vertically disposed above the second PIR sensor 718(2). In some instances, the first PIR sensor 718(1) is vertically aligned with the second PIR sensor 718(2) and/or the channel 106. As shown, the first PIR sensor 718(1) may reside vertically above the divider 720, and the second PIR sensor 718(2) may reside vertically below the divider 720. In some instances, the front cover 102 defines a window 800 through which the first PIR sensor 718(1) and the second PIR sensor 718(2) are configured to receive light rays. The divider 720 may extend across a portion of the window 800, so as to adjoin adjacent sidewalls of the window 800.

Figure 9B:
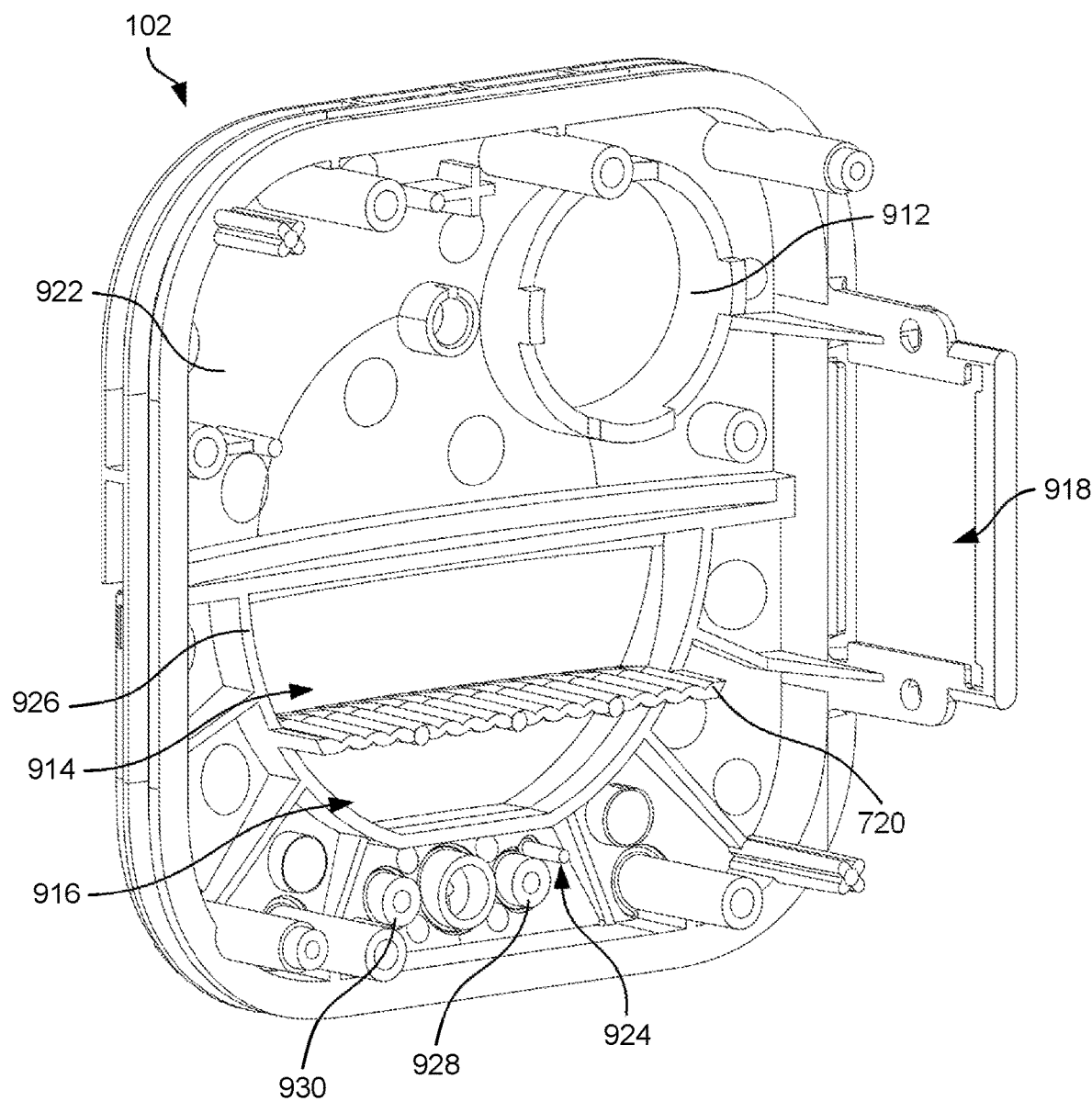

FIGS. 9A-9C illustrate the front cover 102, according to examples of the present disclosure. FIG. 9A illustrates a front perspective view of the front cover 102, FIG. 9B illustrates a rear perspective view of the front cover 102, and FIG. 9C illustrate a front view of the front cover 102.

The front cover 102 includes a front 900 and a back 902 spaced apart from the front 900 (e.g., in the Z-direction). The front 900 may correspond to the front 112 of the device 100. Additionally, the front cover 102 includes a first side 904, a second side 906 spaced apart from the first side 904 (e.g., in the X-direction), a top 908, and a bottom 932 spaced apart from the top 120 (e.g., in the Y-direction).

The front cover 102 defines the channel 106. The channel 106 may direct light emitted from the lighting element 712 of the device 100 to the exterior of the device 100. The light, as emitted via the lighting element 712, may indicate an operation status of the device 100 (e.g., recording video, sensing motion, recording audio, etc.). The front cover 102 also defines a channel 910 that aligns with the channel 124 of the sensor lens 110. The channel 910 may assist in directing sound from the exterior of the device 100 to one or more microphone(s) located within the device 100. In some instances, the channel 106 and the channel 910 are vertically aligned.

The front cover 102 also defines a passageway, channel, etc. through which a camera of the device 100 is disposed or within which the camera lens 108 resides. For example, a channel 912 of the front cover 102 may receive at least a portion of the camera of the device 100 and/or the camera lens 108. In some instances, the channel 912 is horizontally aligned with the channel 106.

The front cover 102 also defines the window 800 having an upper portion 914 (e.g., section) and a lower portion 916 (e.g., section). The first PIR sensor 718(1) is arranged to receive light rays via the upper portion 914, while the second PIR sensor 718(2) is arranged to receive light rays via the lower portion 916. In some instances, the upper portion 914 is larger in size than the lower portion 916. The front cover 102 also defines the divider 720 between the upper portion 914 and the lower portion 916. The divider 720 may extend across opposing sidewalls of the window 800. In some instances, surfaces of the divider 720 are scalloped-shaped. The scalloped-shaped surface of the divider may reduce glare of incoming light rays being received by the first PIR sensor 718(1) and the second PIR sensor 718(2).

The front cover 102 may also include a speaker receptacle 918 that receives a speaker of the device 100. As shown, the speaker receptacle 918 may extend from the back 902 of the front cover 102. The speaker, or a frame/speaker box of the speaker, may mount to the speaker receptacle 918.

The front cover 102 may include first attachment mechanisms 920 that engage or correspond to second attachment mechanisms of the sensor lens. The first attachment mechanisms 920 may represent flanges, slots, tabs, keyways, and the like that engage with corresponding features on the sensor lens 110. Such engagement may secure the sensor lens 110 and the front cover 102 together. For example, the first attachment mechanisms 920 and the second attachment mechanisms may snap together, slide together, press fit together, and so forth. The first attachment mechanisms 920 may be disposed around at least a portion of a perimeter or periphery of the front cover 102. In some instances, adhesives or fasteners may also be used to secure the front cover 102 and the sensor lens 110 together.

The front cover 102 includes an interior surface 922 disposed at the back 902 of the front cover 102. The interior surface 922 may define prongs 924 that engage with features of the microphone assembly 722 for aligning the microphone assembly 722 onto the front cover 102. The interior surface 922 may also define various other tabs, receptacles, slots, etc. for receiving components of the device 100. In some instances, the window 800 includes a flange 926 against which a portion of the microphone assembly 722 abuts. Additionally, a first hole 928 and a second hole 930 may receive fasteners that couple the microphone assembly 722 to the front cover 102.

Figure 10:
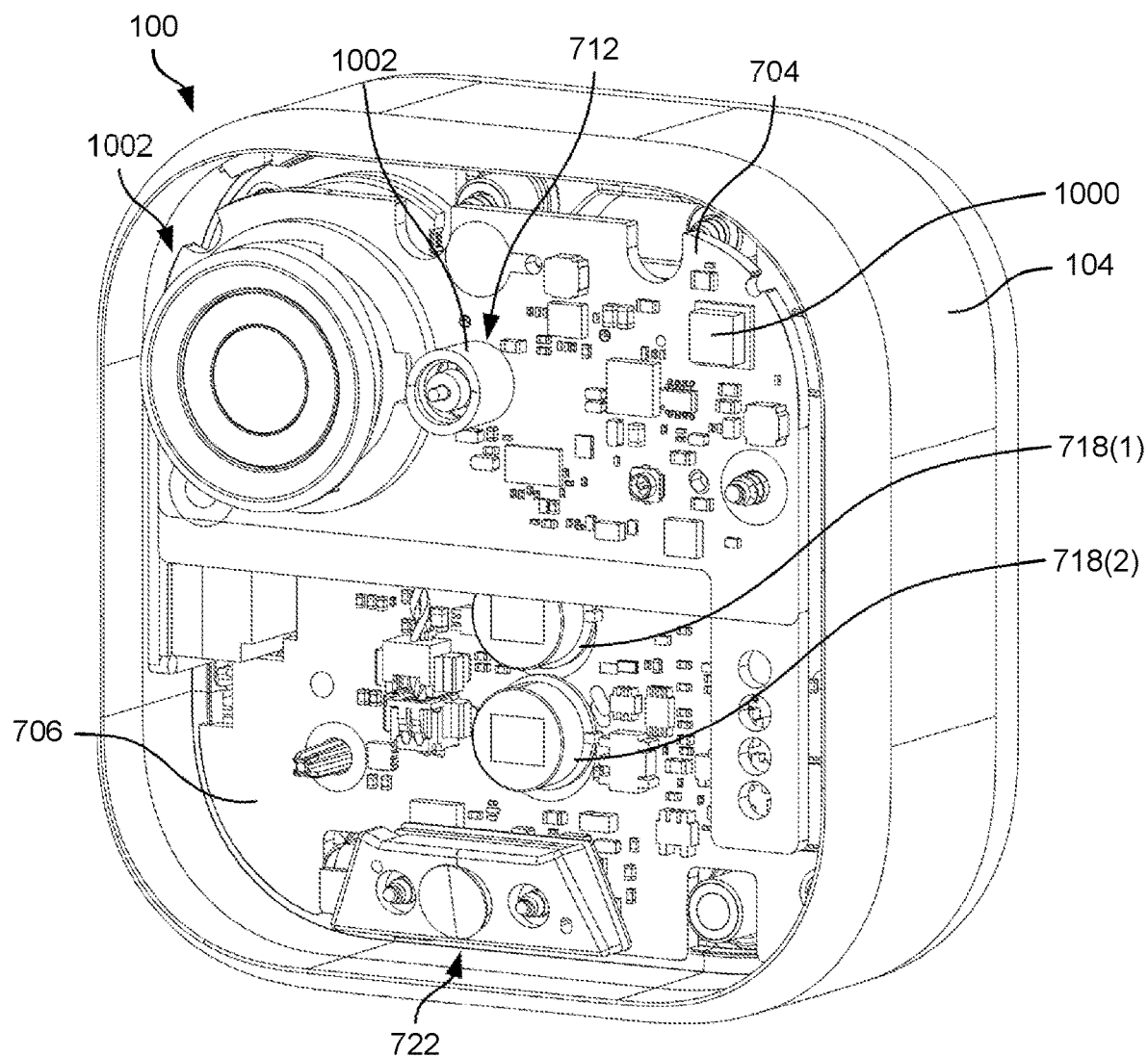
FIG. 10 illustrates a front perspective view the device of FIG. 1, showing the front cover of FIGS. 9A-9C removed, according to an example of the present disclosure
Figure 10:
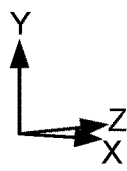

FIG. 10 illustrates example components of the device 100, according to examples of the present disclosure. In FIG. 10, the front cover 102 is shown removed.

The device 100 includes the first PIR sensor 718(1), the second PIR sensor 718(2), the microphone assembly 722, an infrared (IR) sensor 1000, and the lighting element 712. In some instances, the first PIR sensor 718(1), the second PIR sensor 718(2), and the microphone assembly 722 are coupled to and/or communicatively coupled to the second PCB 706, while the IR sensor 1000 and the lighting element 712 are coupled to and/or communicatively coupled to the first PCB 704.

The first PIR sensor 718(1) and the second PIR sensor 718(2) are arranged towards the front 112 of the device 100 for receiving light rays via the window 800 of the front cover 102. For example, the first PIR sensor 718(1) may receive first light rays via the upper portion 914 of the window 800, and the second PIR sensor 718(2) may receive second light rays via the lower portion 916 of the window 800.

The lighting element 712 is configured to output light through the channel 106 in the front cover 102. In some instances, the gasket 716 is disposed around the lighting element 712 to substantially direct light emitted via the lighting element 712 out the channel 106. The IR sensor 1000 may be configured to detect motion within an environment of the device 100. The IR sensor 1000 emits signals (e.g., IR signals) through at least a portion of the front cover 102 and receives the signals to detect IR radiation. As such, at least a portion of the front cover 102 is transmissive to signals emitted from, and received by, the IR sensor 1000.

A camera 1002 of the device 100 may couple to the second PCB 706, and may extend through at least a portion of the first PCB 704. For example, the camera 1002 may include a first end coupled to the second PCB 706 and second end disposed in front of the first PCB 704 (e.g., spaced apart in the Z-direction). The camera lens 108 couples to the second end of the camera 1002. A portion of a body of the camera 1002, between the first end and the second end, is disposed through the first PCB 704. As will be explained herein, the first PCB 704 includes a passageway through which the body of the camera 1002 is disposed.

Figure 11:
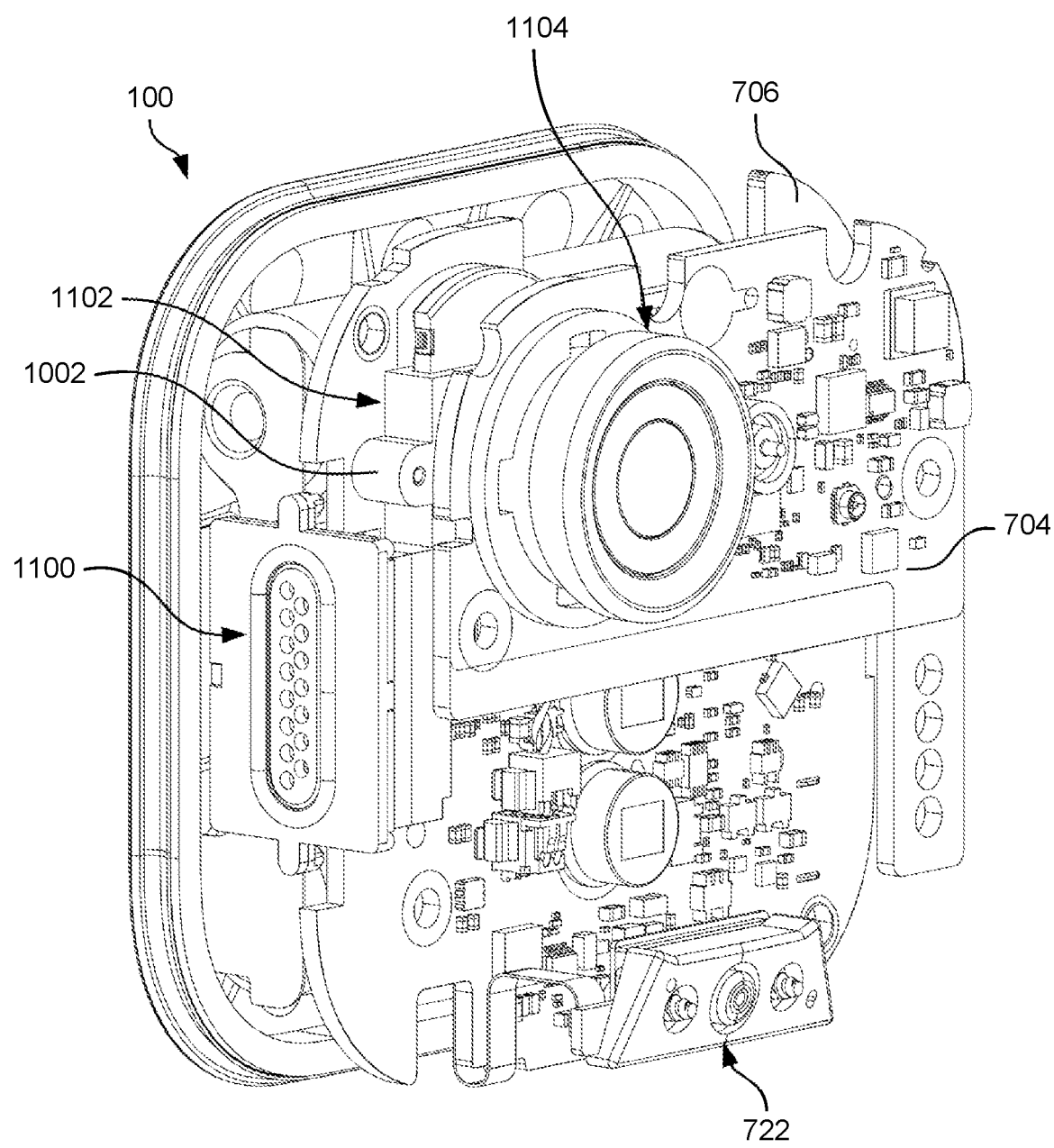
FIG. 11 illustrates a front perspective view the device of FIG. 1, showing a housing removed, according to an example of the present disclosure.

FIG. 11 illustrates example components of the device 100, according to examples of the present disclosure. In FIG. 11, the housing 104 and the front cover 102 are shown removed.

The device 100 includes a speaker 1100 that emits sound into an environment. The device 100 is disposed behind (e.g., in the X-direction) the orifice 200. In some instances, the speaker 1100 is received within the speaker receptacle 918. The speaker 1100 may communicatively couple to at least one of the first PCB 704 or the second PCB 706. Additionally, or alternatively, the speaker 1100 may couple to an inside surface of the housing 104. In some instances, a speaker box provides back volume to the speaker 1100. The speaker 1100 may represent a tweeter speaker, a midrange speaker, or a subwoofer speaker.

As introduced above, the camera 1002 may include a first end 1102 coupled to the second PCB 706, and a second end 1104 disposed through the first PCB 704. The second end 1104 is shown being spaced apart from the first PCB 704 (e.g., in the Z-direction). In some instances, the first PIR sensor 718(1), the second PIR sensor 718(2), the IR sensor 1000, the lighting element 712, and the camera 1002 are oriented or face a first direction (e.g., the front 112), while the speaker 1100 is oriented or faces a second direction different from the first direction (e.g., the first side 116). A microphone of the microphone assembly 722 may also be oriented or face the first direction.

The device 100 may include additional computing components not described. For example, the device 100 may include processors, memory, circuits, transformers, power supplies, network interfaces (e.g., Wi-Fi, Bluetooth, ZigBee, LTE, Bluetooth Low Energy (BLE), thermal pads, shielding foams, shielding plates, ambient light sensor, and so forth. In some instances, these computing components may be disposed on the first PCB 704 and/or the second PCB 706. Various connectors (e.g., flex circuits) may communicatively couple such components together.

FIG. 12 illustrates the first PCB 704, according to examples of the present disclosure. In some instances, the first PCB 704 includes a first side 1200 and a second side 1202 opposite the first side 1200 (e.g., spaced apart in the Z-direction). The first side 1200 of the first PCB 704 may include the IR sensor(s) 1000 configured to emit signals into the environment. Additionally, the lighting element 712 may be disposed on the first side 1200 of the first PCB 704 for emitting light through the light pipe 714 and the channel 106. The second side 1202 of the first PCB 704 may include the first connector 708 for communicatively coupling to the second PCB 706 via the second connector 710. For example, the first connector 708 may include receptacles that receive prongs of the second connector 710.

The first PCB 704 may also define an opening 1204 through which at least a portion of the camera 1002 is disposed. For example, the camera 1002 may mount to the second PCB 706, and a body of the camera 1002 may be disposed through the opening 1204 such that the camera 1002 is configured to image the environment via the camera lens 108.

The first PCB 704 may further include various cutouts 1206 for aligning the first PCB 704 within the front cover 102, vice versa. For example, the cutouts 1206 may engage with protrusions, flanges, and so forth on the interior surface 922 of the front cover 102. Additionally, or alternatively, channels 1208 may be disposed through the first PCB 704, and prongs of the front cover 102 and/or extending from the second PCB 706 may be received at least partially within the channels 1208 for aligning the front cover 102, the first PCB 704, the second PCB 706, and so forth.

Figure 13:
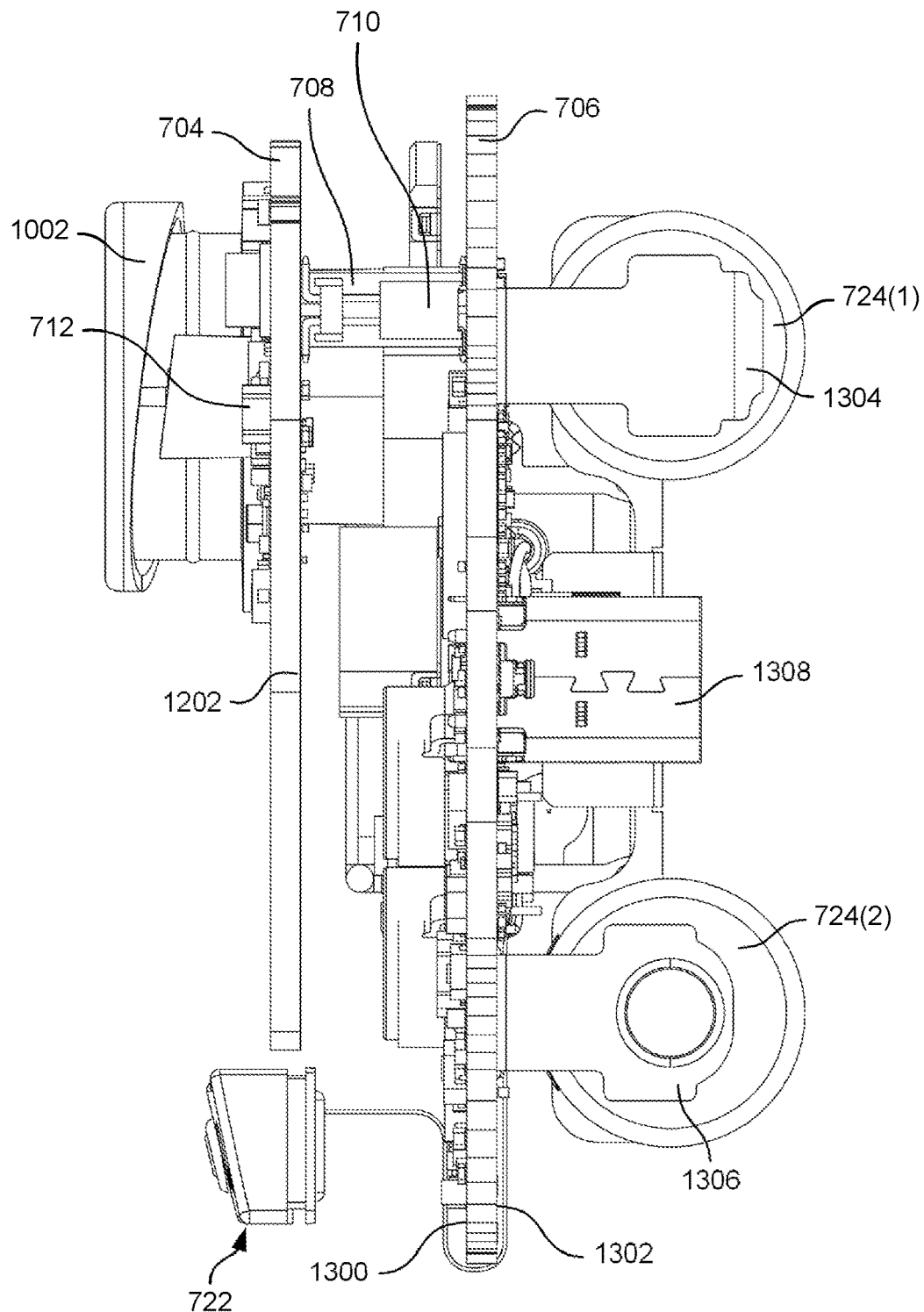
FIG. 13 illustrates example internal components of the device of FIG. 1, according to an example of the present disclosure.

FIG. 13 illustrates example components coupled to the first PCB 704 and second PCB 706, according to examples of the present disclosure. The view in FIG. 13 is from the second side 118 of the device 100.

The first PCB 704 is shown disposed in front of the second PCB 706. The first connector 708 of the first PCB 704 is disposed on the second side 1202 of the first PCB 704, and the second connector 710 of the second PCB 706 is disposed on a first side 1300 of the second PCB 706. The first connector 708 and the second connector 710 couple together to communicatively connect first computing components of the first PCB 704 (e.g., the lighting element 712), with second computing components of the second PCB 706 (e.g., the camera 1002). The microphone assembly 722 may communicatively connect to at least one of the first PCB 704 or the second PCB 706.

The first battery 724(1) and the second battery 724(2) may be disposed on a second side 1302 of the second PCB 706, opposite the first side 1300. First battery terminals 1304 may couple the first battery 724(1) to the second PCB 706, and second battery terminals 1306 may couple the second battery 724(2) to the second PCB 706. The second side 1302 of the second PCB 706 may also include an input port 1308 for receiving various cables (e.g., USB-C, auxiliary, etc.)

Figure 14:
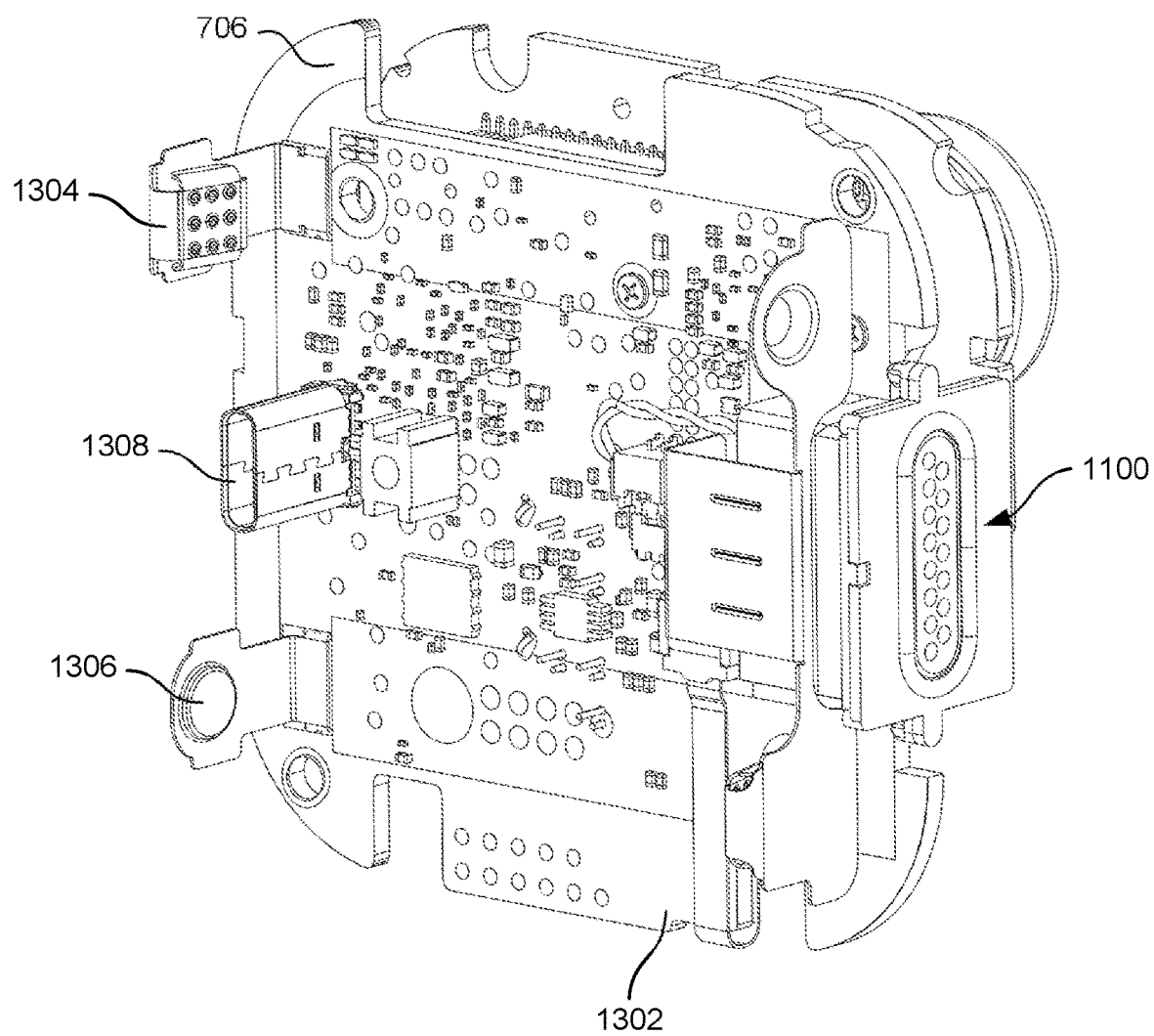
FIG. 14 illustrates example internal components of the device of FIG. 1, according to an example of the present disclosure.

FIG. 14 illustrates example components coupled to the second PCB 706, according to examples of the present disclosure. The second PCB 706 is shown including the first battery terminals 1304 and the second battery terminals 1306 for receiving the first battery 724(1) and the second battery 724(2), respectively. Additionally, the input port 1308 extends form the second side 1302 of the second PCB 706 for being disposed through the second receptacle 208 to receive various cables (e.g., USB-C, auxiliary, etc.). In some instances, the speaker 1100 may communicatively connect to the second side 1302 of the second PCB 706.

Figure 15:
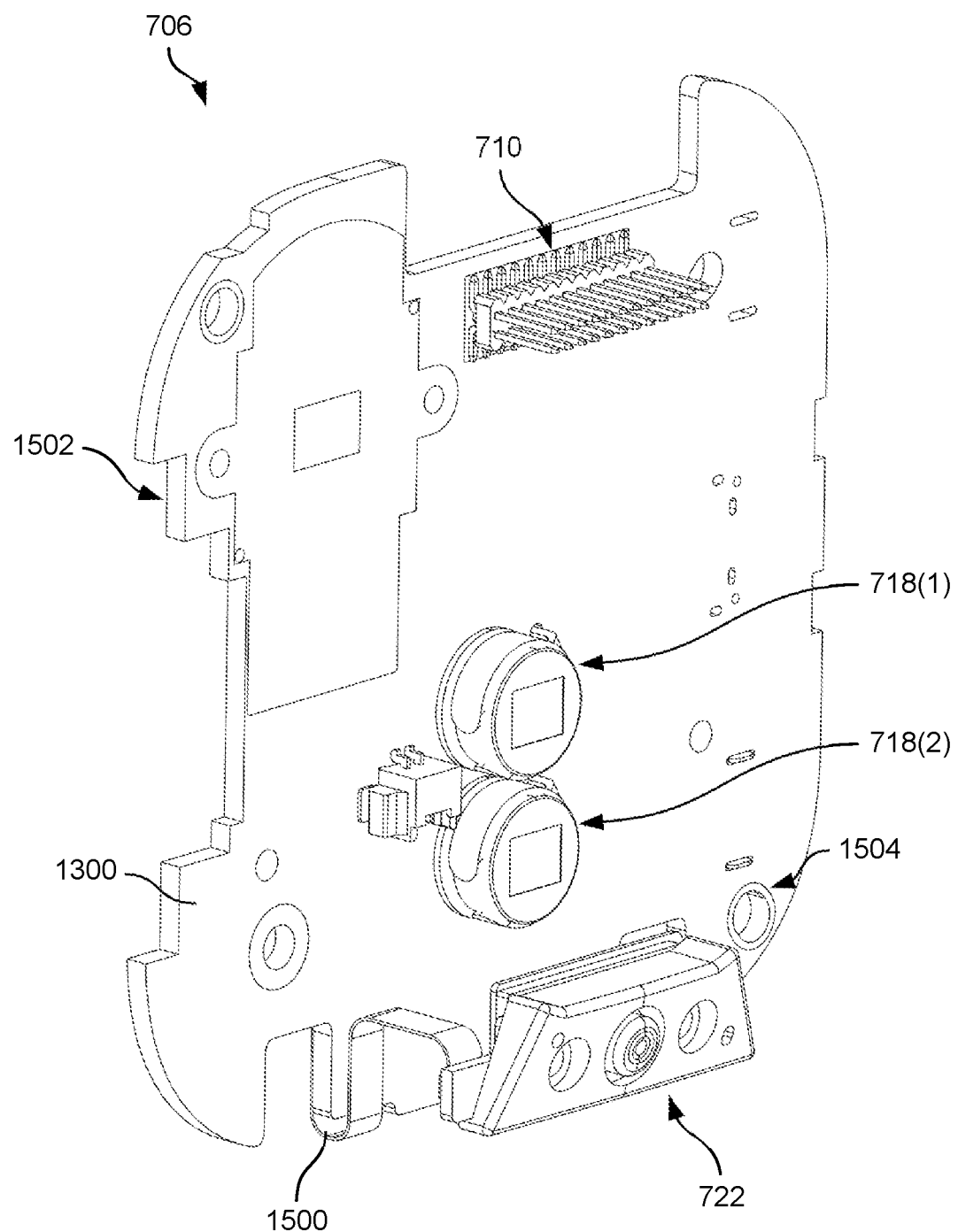
FIG. 15 illustrates an example PCB of the device of FIG. 1, according to an example of the present disclosure.

FIG. 15 illustrates the second PCB 706, according to examples of the present disclosure. The first PIR sensor 718(1) and the second PIR sensor 718(2) are shown mounted to the second PCB 706. In some instances, the first PIR sensor 718(1) and the second PIR sensor 718(2) are mounted to the first side 1300 of the second PCB 706. The second connector 710 is also mounted to the first side 1300 of the second PCB 706. As shown, the second connector 710 may include prongs that are received within receptacles of the first connector 708.

The microphone assembly 722, or components thereof, may also communicatively couple to the second PCB 706. For example, a FPC 1500 of the microphone assembly 722 may couple to the second side 1302 of the second PCB 706, opposite the first side 1300 of the second PCB 706. Although not shown, various other components may couple to the first side 1300 of the second PCB 706, such as the camera 1002, and/or the second side 1302 of the second PCB 706, such as the speaker 1100.

The second PCB 706 may further include various cutouts 1502 for aligning the second PCB 706 within the housing 104 and/or the rear cover 126, respectively, vice versa. For example, the cutouts 1502 may engage with protrusions, flanges, and so forth of the housing 104. The cutouts 1502 may also accommodate the speaker 1100, such as the speaker box. Additionally, or alternatively, channels 1504 may be disposed through the second PCB 706, and prongs of the front cover 102, the housing 104, and/or the rear cover 126 may be received at least partially within the channels 1504 for aligning the second PCB 706 within the device 100.

Figure 16A:
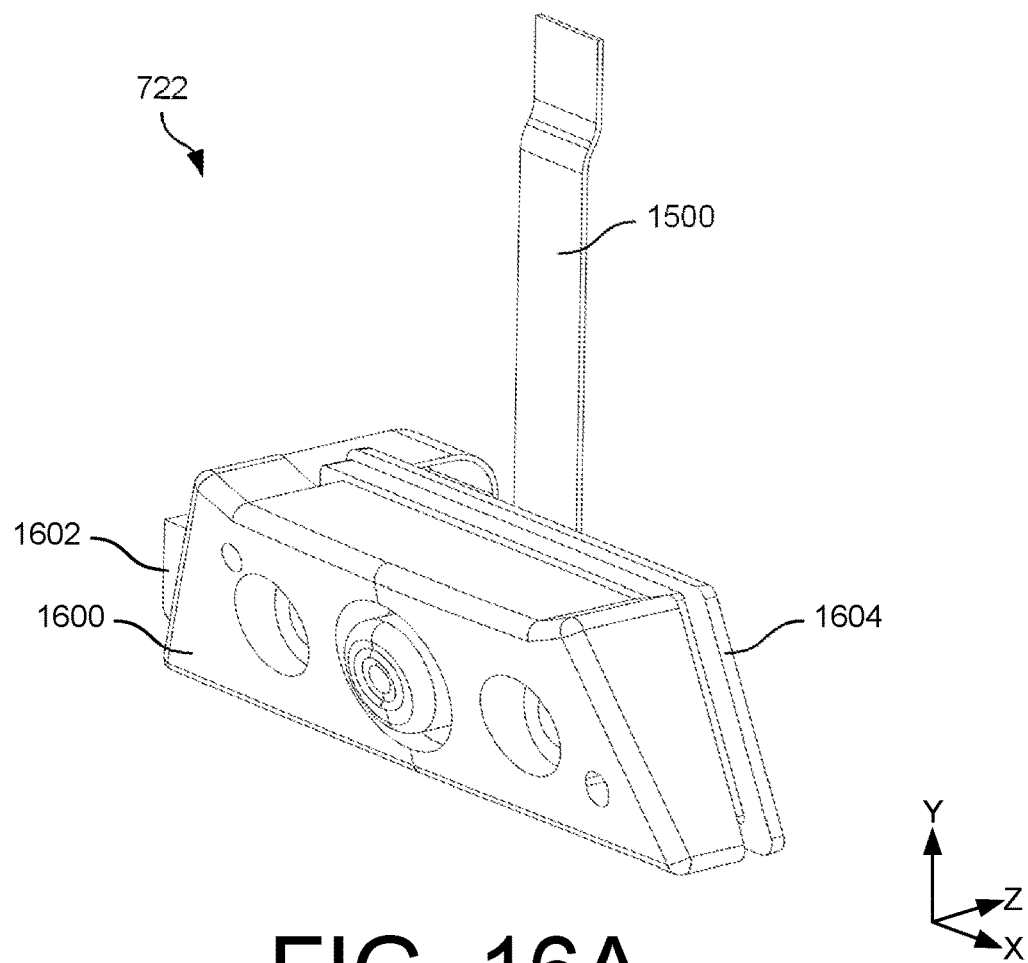
FIGS. 16A and 16B illustrate an example microphone assembly of the device of FIG. 1, according to an example of the present disclosure.
Figure 16B:
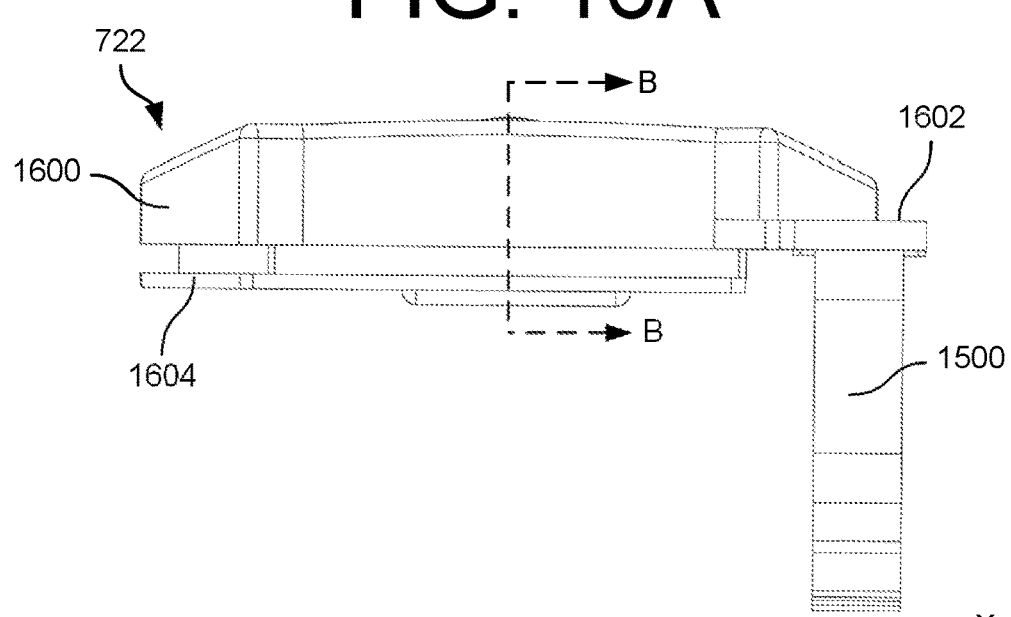

FIGS. 16A and 16B illustrate the microphone assembly 722, according to examples of the present disclosure. FIG. 16A illustrates a front perspective view of the microphone assembly 722, and FIG. 16B illustrates a top view of the microphone assembly 722.

In some instances, the microphone assembly 722 includes a seal 1600, the FPC 1500, a microphone PCB 1602, and a bracket 1604. As discussed herein, the seal 1600 is configured to encapsulate a microphone of the device 100. For example, the seal 1600 may fold from an unfolded state to a folded state in which the seal 1600 encapsulates the microphone. In FIGS. 16A and 16B, the seal 1600 is shown in the folded state.

The microphone is disposed on the microphone PCB 1602. As such, in some instances, the seal 1600 may at least partially encapsulate the microphone PCB 1602. That is, the microphone PCB 1602 may be at least partially disposed within the seal 1600. In some instances, a first end of the microphone PCB 1602 is disposed within the seal 1600, while an opposite second end may protrude from the seal 1600 for coupling to the FPC 1500. In doing so, the FPC 1500 extends from the microphone PCB 1602 to communicatively couple the microphone PCB 1602 to additional computing components within the device 100 (e.g., the first PCB 704 and/or the second PCB 706).

The bracket 1604 couples the microphone assembly 722 to the front cover 102. For example, the bracket 1604 may couple the seal 1600 and the microphone PCB 1602 to the front cover 102. The bracket 1604 may include opening(s) through which fastener(s) are disposed for coupling the microphone assembly 722 to the front cover 102. The seal 1600 and the microphone PCB 1602 may similarly include openings for receiving the fastener(s) and through which the fastener(s) are disposed for coupling the microphone assembly 722 to the front cover 102.

Figure 17:
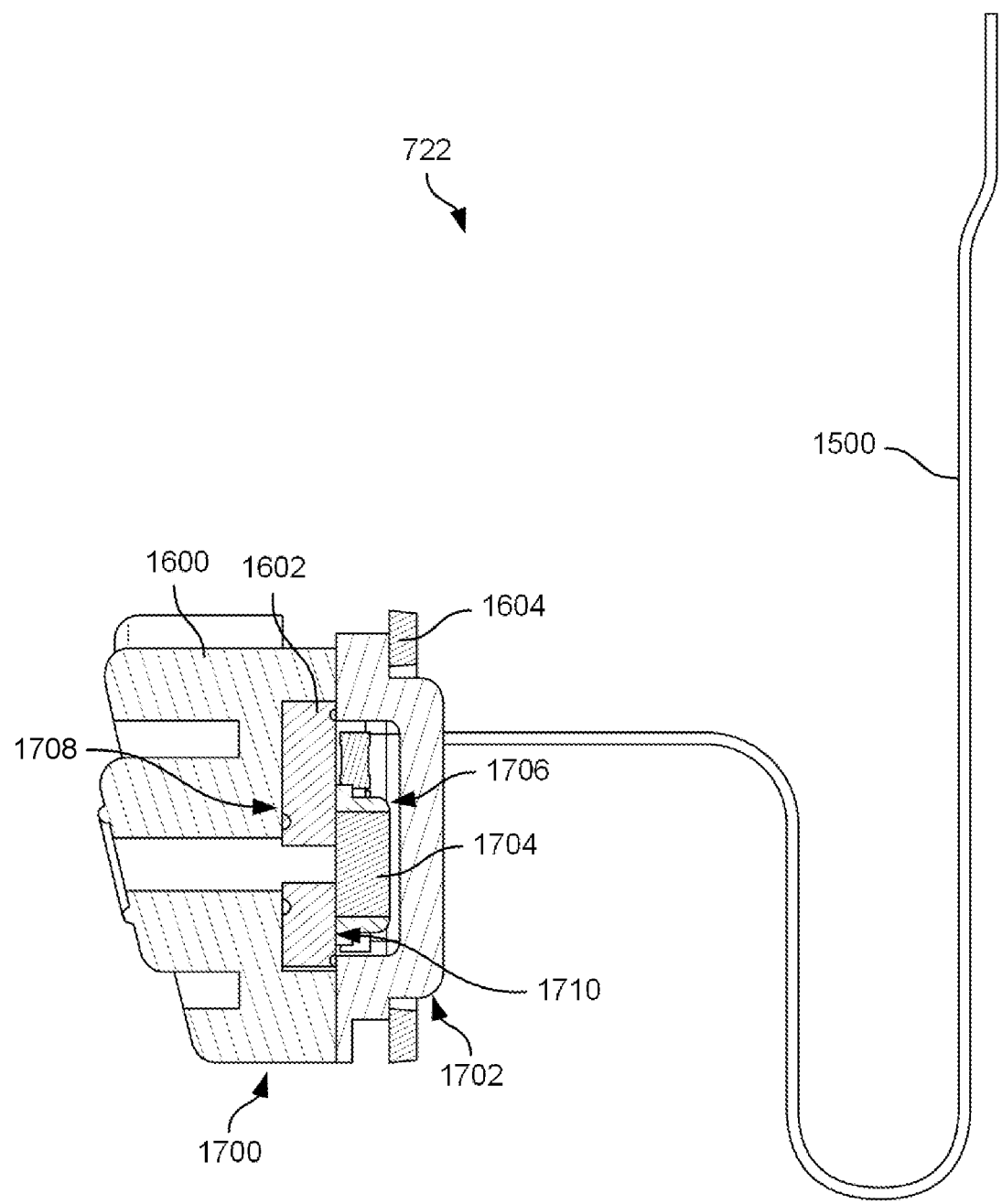
FIG. 17 illustrates a cross-sectional view of the microphone assembly of FIGS. 16A and 16B, taken along line B-B of FIG. 16B, according to an example of the present disclosure.

FIG. 17 illustrates a cross-sectional view of the microphone assembly 722, taken along line B-B of FIG. 16B, according to examples of the present disclosure. As will be explained herein, the seal 1600 may include a first portion 1700 and a second portion 1702 coupled to the first portion 1700. For example, the first portion 1700 and the second portion 1702 may be pivotably coupled together for being folded and encapsulating a microphone 1704. When the seal 1600 is in the folded state, as shown in FIG. 17, the seal 1600 may define a microphone cavity 1706. For example, the first portion 1700 may define a first part of the microphone cavity 1706, and the second portion 1702 may define a second part of the microphone cavity 1706. When folded, the first part and the second part collectively define the microphone cavity 1706.

The seal 1600, such as the first portion 1700, defines a channel that directs sound to the microphone 1704 mounted to the microphone PCB 1602. In some instances, the microphone PCB 1602 includes a first side 1708 and a second side 1710 opposite the first side 1708 (e.g., spaced apart in the Z-direction). The microphone PCB 1602 may define a channel that directs sound to the microphone 1704 on the second side 1710. The channel of the first portion 1700 and the channel of the microphone PCB 1602 may align for directing sound to the microphone 1704. Once the device 100 is assembled, the microphone cavity 1706 may acoustically seal the microphone 1704. Sound, however, may be directed through the channel 124, the channel 910, a channel disposed through the first portion 1700, and a channel disposed through the microphone PCB 1602.

In some instances, the first side 1708 is oriented towards the front 112 of the device 100, and the second side 1710 is oriented towards the back 114 of the device 100. In some instances, the first side 1708 abuts and/or is disposed in the first portion 1700 of the seal 1600 (or is disposed within the first part of the microphone cavity 1706), while the second side 1710 is disposed within the second portion 1702 of the seal 1600. In some instances, microphone 1704 is disposed on the second side 1710 of the microphone PCB 1602. Additionally computing components of the microphone PCB 1602 may reside on the second side 1710 (e.g., resistors, capacitors, etc.). In some instances, the FPC 1500 couples to the second side 1710 of the microphone PCB 1602.

The bracket 1604 is further shown being disposed adjacent to the second portion 1702 of the seal 1600. When the fastener(s) are disposed through the opening(s) of the bracket 1604 and coupled to the front cover 102, the fastener(s) may force the bracket 1604 against the seal 1600. This force may at least partially compress the seal 1600, and may seal an interface between the first portion 1700 and the second portion 1702. In some instances, the seal 1600 may be manufactured from a flexible or semi-rigid material (e.g., silicon, silicone, rubber, etc.) in order to fold around and encapsulate the microphone 1704.

Figure 18A:
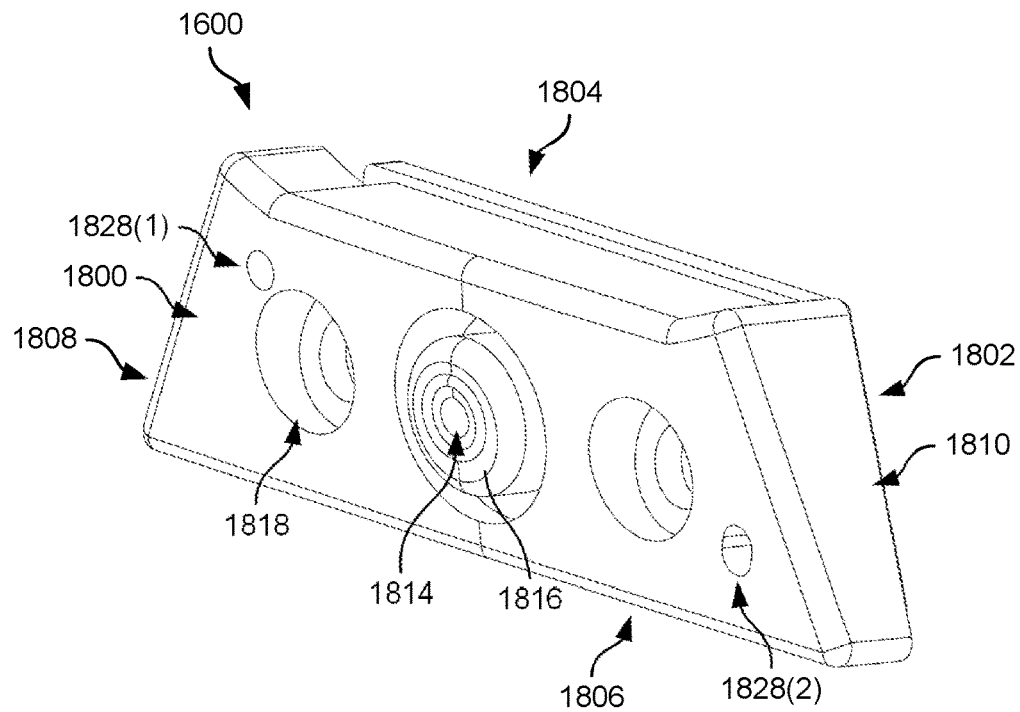
FIGS. 18A-18F illustrate an example seal of the microphone assembly of FIGS. 16A and 16B, according to an example of the present disclosure.
Figure 18B:
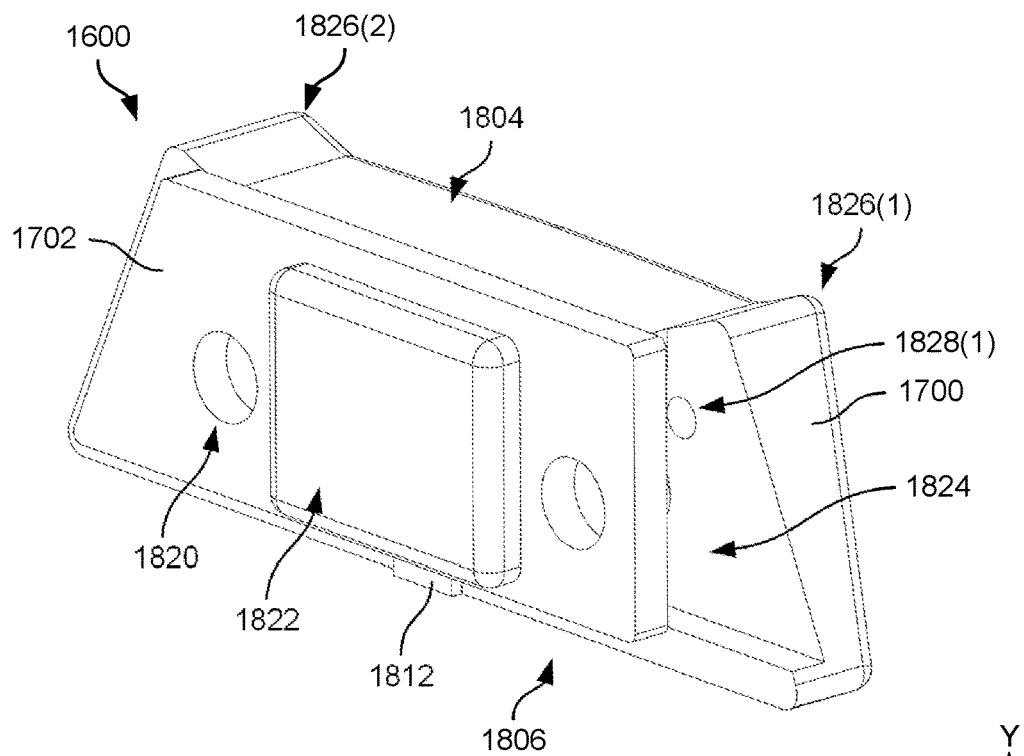
Figure 18C:
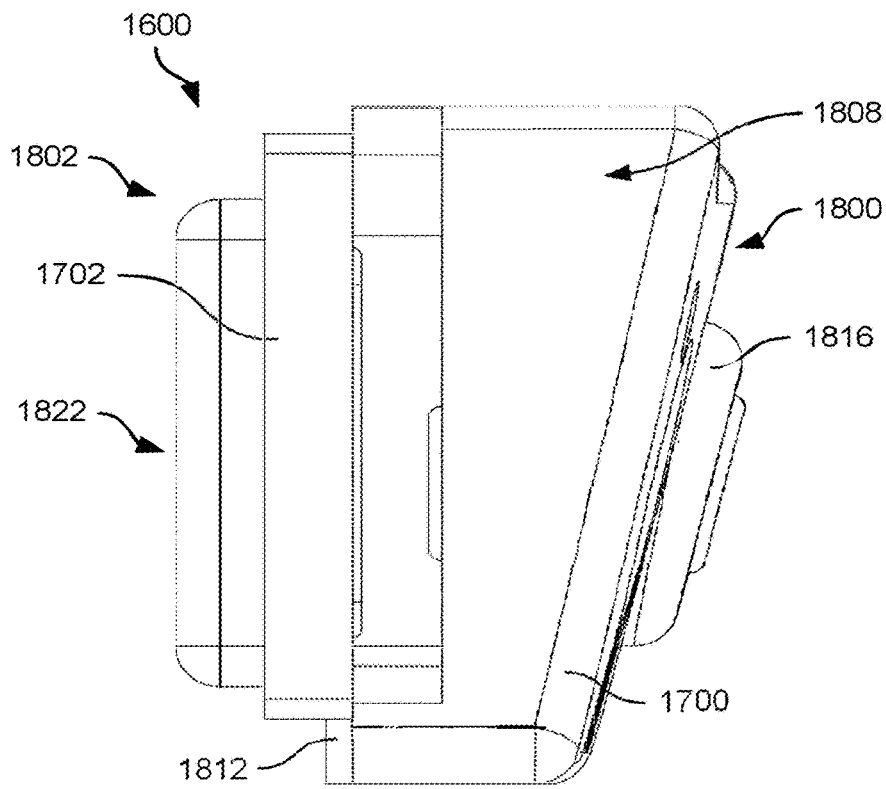
Figure 18D:
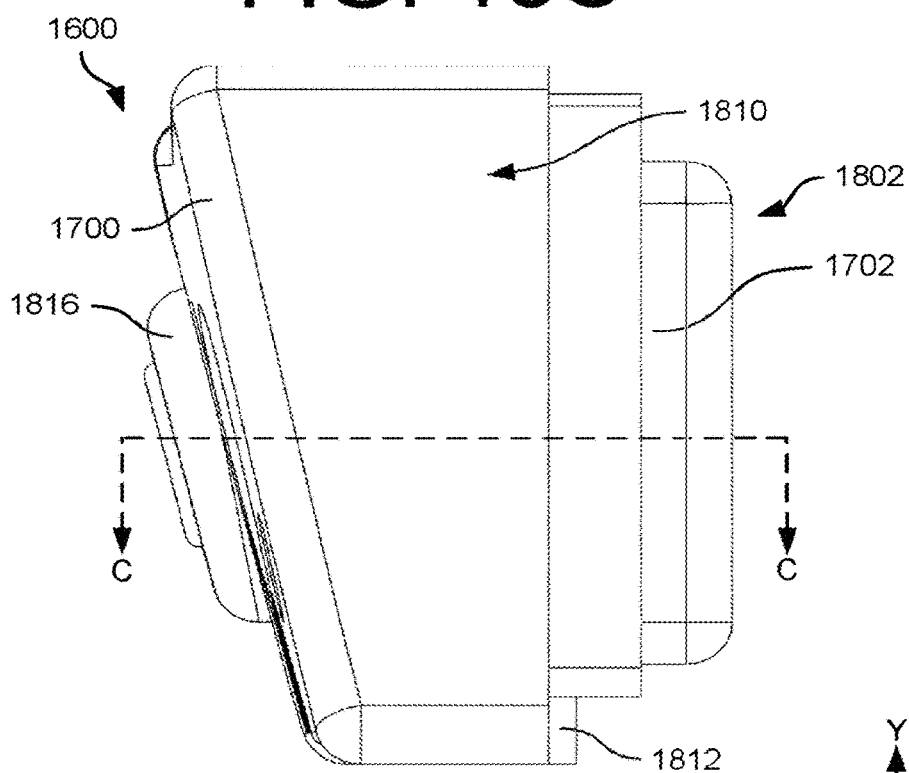
Figure 18E:
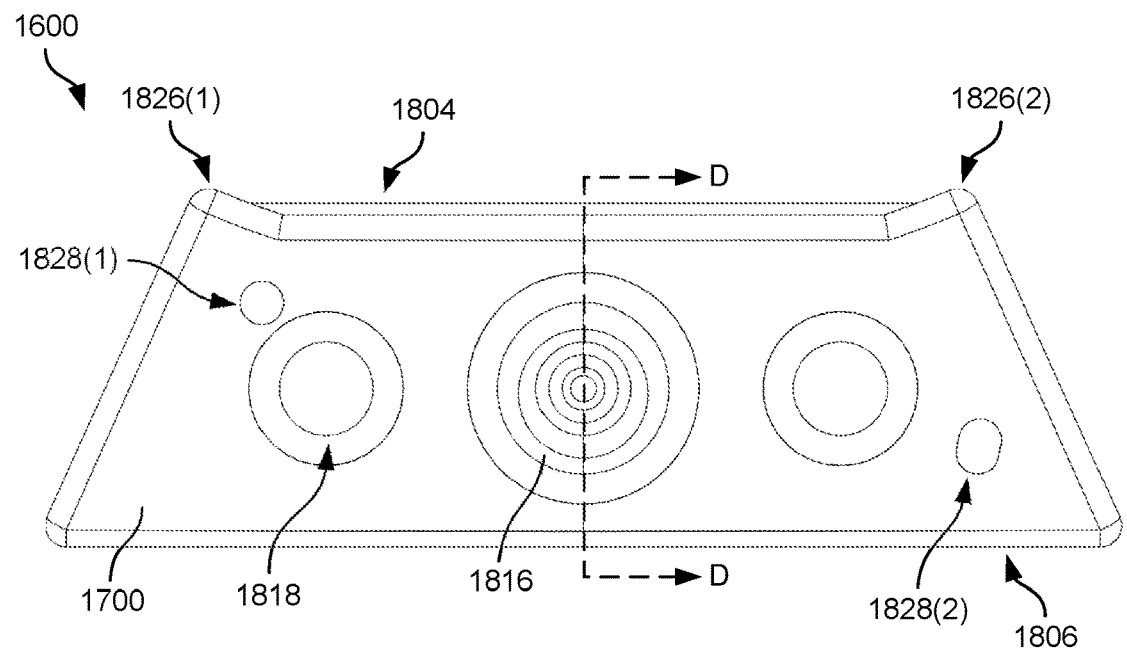
Figure 18F:
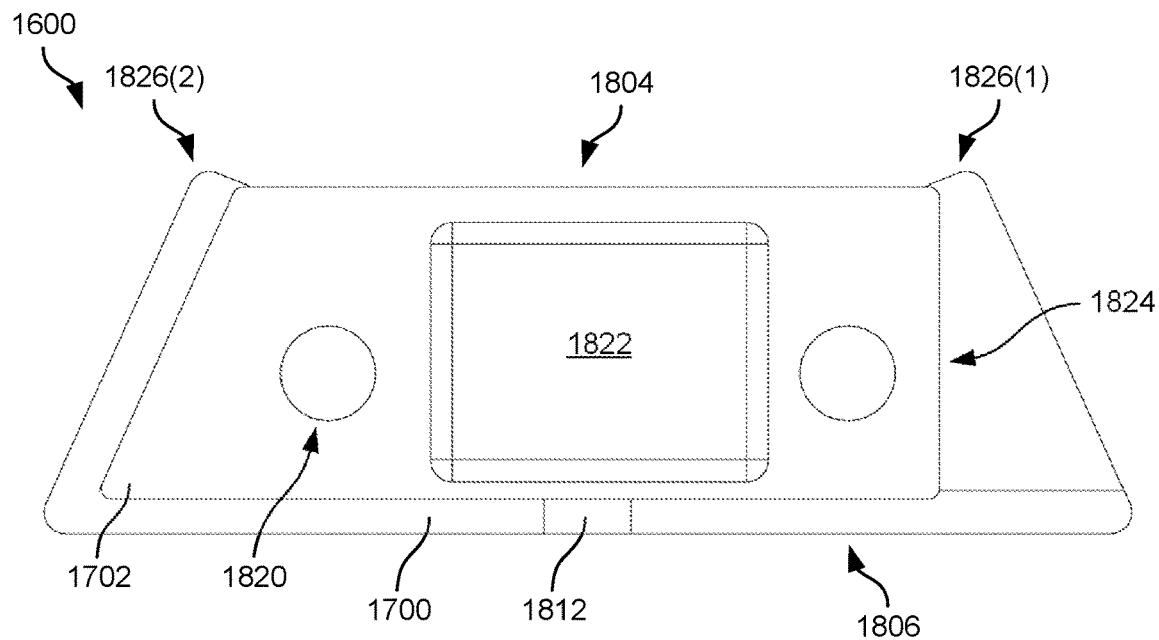

FIGS. 18A-18F illustrate the seal 1600, according to examples of the present disclosure. FIG. 18A illustrates a front perspective view of the seal 1600, FIG. 18B illustrates a rear perspective view of the seal 1600, FIG. 18C illustrates a first side view of the seal 1600, FIG. 18D illustrates a second side view of the seal 1600, FIG. 18E illustrates a front view of the seal 1600, and FIG. 18F illustrates a rear view of the seal 1600. The views shown in FIG. 18A-18F illustrate the seal 1600 in the folded state.

The seal 1600 may include a front 1800, a back 1802 opposite the front 1800 (e.g., in Z-direction), a first side 1808, a second side 1810 opposite the first side 1808 (e.g., in the X-direction), a top 1804, and a bottom 1806 opposite the top 1804 (e.g., in the Y-direction). The front 1800 may be oriented towards, abut, or couple to the interior surface 922 of the front cover 102. The back 1802 may be abutted by or receive the bracket 1604. In some instances, the front 1800 may be defined by the first portion 1700 of the seal 1600, while the back 1802 may be defined by the second portion 1702 of the seal 1600.

In some instances, the first portion 1700 and the second portion 1702 are coupled to one another via a flap 1812. Between the unfolded state and the folded state, the first portion 1700 may hinge about the flap 1812, vice versa. For example, the seal 1600 may be unfolded to expose the microphone cavity 1706. The microphone PCB 1602, with the microphone 1704, may be placed into the microphone cavity 1706. Therein, the first portion 1700 and the second portion 1702 may be folded together such that the microphone PCB 1602 is at least partially interposed between the first portion 1700 and the second portion 1702. The flap 1812 may be centrally located between the first side 1808 and the second side 1810, and in some instances, is located on the bottom 1806 of the seal 1600.

The seal 1600 includes a channel 1814 for channeling sound to the microphone 1400. The channel 1814 of the seal 1600, once the seal 1600 couples to the device 100 (e.g., the front cover 102), may align with the channel 124 of the sensor lens 110. The channel 1814 of the seal 1600 may be disposed through a thickness of the first portion 1700 (e.g., in the Z-direction) for channeling sound to the microphone 1704. In some instances, the channel 1814 may be centrally located between the first side 1808 and the second side 1810. Additionally, in some instances, the channel 1814 may be centrally located between the top 1804 and the bottom 1806.

In some instances, the channel 1814 is formed by, or within, a grommet 1816 of the first portion 1700 of the seal 1600. A front of the grommet 1816 may extend beyond a front surface of the front 1800 of the seal 1600. When the seal 1600 couples to the front cover 102, and during a tightening of the fastener(s), the grommet 1816 may compress between the interior surface 922 of the front cover 102 and the first side 1708 of the microphone PCB 1602. This compression may form a seal between the front 1800 of the seal 1600 and the interior surface 922 of the front cover 102, as well as between the seal 1600 and the microphone PCB 1602 (e.g., within the microphone cavity 1706). As such, the grommet 1816 may be configured to deflect in a direction towards the microphone cavity 1706 (e.g., in the Z-direction).

The seal 1600 may include passageways for receiving the fastener(s) that couple the microphone assembly 722 to the front cover 102. The passageways may be formed within, or disposed through, the first portion 1700 and the second portion 1702. For example, the first portion 1700 may include first passageways 1818 and the second portion 1702 may include second passageways 1820. When the seal 1600 is folded, the first passageways 1818 and the second passageways 1820 may align such that the fastener(s) may be disposed therethrough, respectively.

In some instances, the seal 1600 includes two first passageways 1818 and two second passageways 1820. A first of the first passageways 1818 may be disposed on a first side of the channel 1814, while a second of the first passageways 1818 may be disposed on a second side of the channel 1814. Similarly, a first of the second passageways 1820 may be disposed on the first side of the channel 1814, while a second of the second passageways 1820 may be disposed on a second side of the channel 1814. In some instances, the channel 1814, the first passageways 1818, and the second passageways 1820 are horizontally aligned (e.g., X-plane).

As noted above, the first portion 1700 and the second portion 1702 may form parts (e.g., sections, volumes, etc.) of the microphone cavity 1706 for receiving the microphone PCB 1602 and the microphone 1704. In some instances, the second portion 1702 includes a pocket 1822 that extends from the back 1802 of the seal 1600. The pocket 1822 may provide a space, within the microphone cavity 1706, for receiving the microphone 1704. The bracket 1604, once coupled to the seal 1600 or disposed against the second portion 1702, may include a cutout that accommodates the pocket 1822. For example, the bracket 1604 may include a cutout within which the pocket 1822 resides. As shown, the second passageways 1820 may be disposed on either side of the pocket 1822.

In the folded state, the seal 1600 defines a slot 1824 through which a portion of the microphone PCB 1602 may extend. The slot 1824 is communicatively connected to the microphone cavity 1706. In some instances, the slot 1824 is located proximate and/or on the first side 1808 of the seal 1600. In other words, at or along the second side 1810, the microphone cavity 1706 may be enclosed by the first portion 1700 and the second portion 1702. At or along the first side 1808, the microphone cavity 1706 may be open via the slot 1824 defined between and/or by the first portion 1700 and the second portion 1702. However, the slot 1824 is sized (e.g., height, width, etc.) and configured to receive the microphone PCB 1602. As such, when the microphone PCB 1602 is placed within the slot 1824, the microphone cavity 1706 may be closed. In some instances, the slot 1824 is formed via the first portion 1700 and/or the second portion 1702.

In some instances, the front 1800 angles in a direction outwards, from the bottom 1806 to the top 1804. For example, the front 1800, from the bottom 1806 to the top 1804, way extend in a direction away from the back 1802 (e.g., extend in the Z-direction). In some instances, the angle of the front 1800 may conform to the interior surface 922 of the front cover 102 such that the seal 1600 seals against the interior surface 922. The back 1802, in some instances, may be substantially planar.

In some instances, the top 1804 includes tabs 1826, such as a first tab 1826(1) and/or a second tab 1826(2) that engage with features of the front cover 102 for aligning the seal 1600 (or the microphone assembly 722) on the front cover 102. For example, the first tab 1826(1) and/or the second tab 1826(2) may engage with the flange 926 disposed around the window 800 formed within front cover 102. The seal 1600 may also include holes 1828, such as a first hole 1828(1) and a second hole 1828(2) that receive the prongs 924 disposed on the front cover 102. The engagement between the holes 1828 and the prongs 924 may further align the seal 1600 on the front cover 102. In some instances, the holes 1828 are disposed on the front 1800 of the seal 1600, and may extend at least partially through the first portion 1700.

Figure 19:
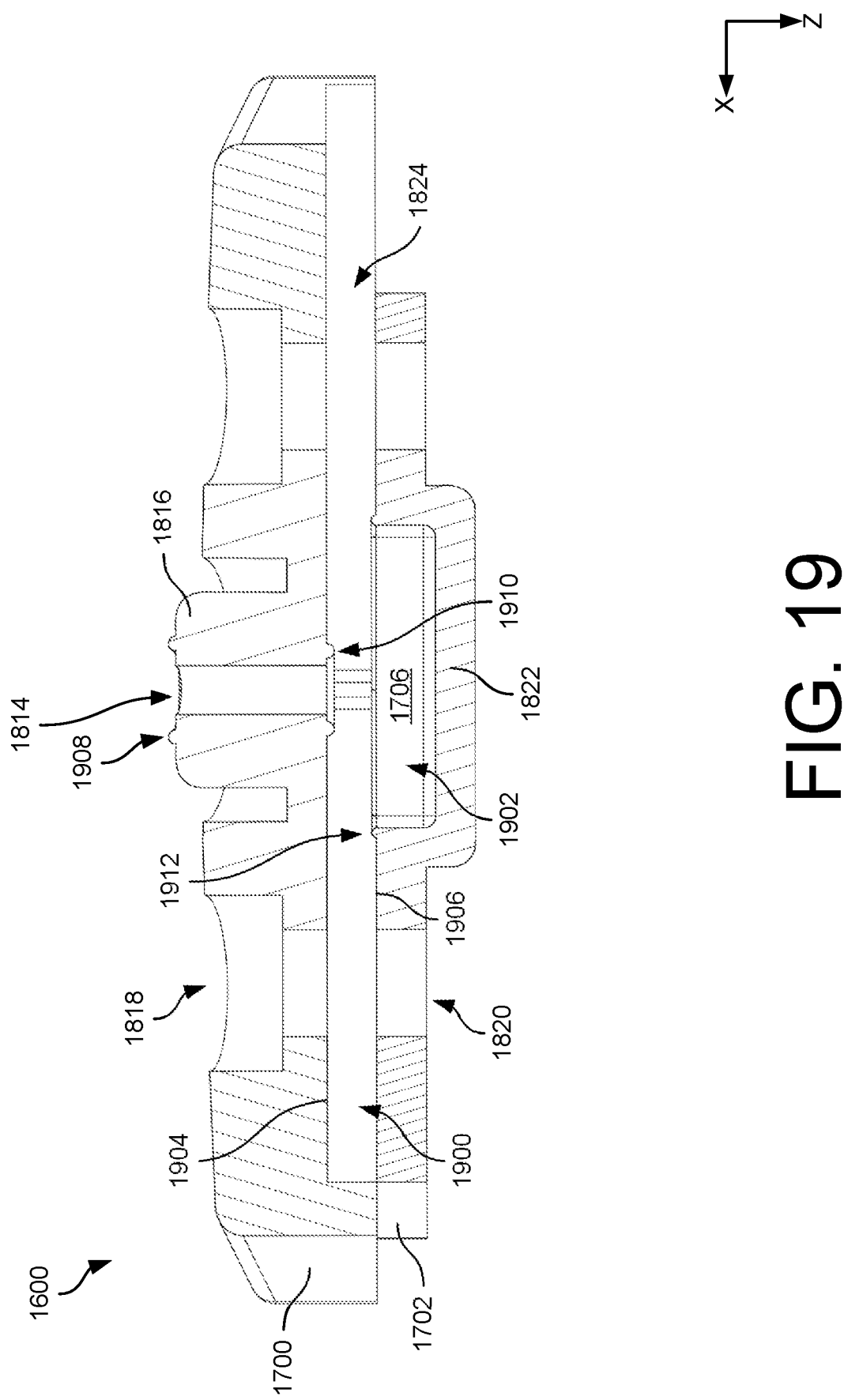
FIG. 19 illustrates a cross-sectional view of the seal of FIGS. 18A-18F, taken along line C-C of FIG. 18D, according to an example of the present disclosure.

FIG. 19 illustrates a cross-sectional view of the seal 1600, taken along line C-C of FIG. 18D, according to examples of the present disclosure. In some instances, the seal 1600 is formed via the first portion 1700 and the second portion 1702, and when folded together (as shown in FIG. 19), define the microphone cavity 1706.

The first portion 1700 and the second portion 1702 may define respective parts of the microphone cavity 1706. For example, the first portion 1700 may define a first part 1900 of the microphone cavity 1706 and the second portion 1702 may define a second part 1902 of the microphone cavity 1706. When the first portion 1700 and the second portion 1702 are folded together, sections of the first portion 1700 and the second portion 1702 may seal together to enclose the microphone cavity 1706. In doing so, collectively, the first part 1900 and the second part 1902 may form the microphone cavity 1706 for receiving the microphone PCB 1602 and the microphone 1704. As shown, and in some instances, the second part 1902 of the microphone cavity 1706 may be formed via the pocket 1822 of the second portion 1702. In some instances, the microphone 1704 is disposed within the second part 1902 of the microphone cavity 1706, while the microphone PCB 1602 may be disposed within the first part 1900 of the microphone cavity 1706.

When the microphone PCB 1602 is disposed within the seal 1600, the first side 1708 of the microphone PCB 1602 may be disposed against a first surface 1904 of the first portion 1700, and the second side 1710 may be disposed against a second surface 1906 of the second portion 1702. In some instances, the first portion 1700 includes a first ring-shaped extrusion 1908 formed on the front 1800 (and/or the grommet 1816) that seals the front 1800 to the interior surface 922 of the front cover 102. The first portion 1700 may also include a second ring-shaped extrusion 1910 formed on the first surface 1904 (and/or the grommet 1816) that seals against the first side 1708 of the microphone PCB 1602. As shown, the first ring-shaped extrusion 1908 and the second ring-shaped extrusion 1910 are formed around the channel 1814. Additionally, in some instances, the second portion 1702 may include a third ring-shaped extrusion 1912 formed around the second part 1902 (e.g., the pocket 1822) for sealing against the second side 1710 of the microphone PCB 1602.

The first passageways 1818 and the second passageways 1820 are further shown extending through the seal 1600. For example, the first passageways 1818 may be disposed through the first portion 1700, and the second passageways 1820 may be disposed through the second portion 1702. As shown, in folded state, the first passageways 1818 and the second passageways 1820 may align for receiving fastener(s) to couple the microphone assembly 722 to the front cover 102.

The slot 1824 is further shown formed within the seal 1600, between the first portion 1700 and the second portion 1702. The slot 1824 may include a width (e.g., in the Z-direction) that extends between the first surface 1904 of the first portion 1700 and the second surface 1906 of the second portion 1702. The width may accommodate the width of the microphone PCB 1602, such that when the microphone PCB 1602 is disposed within the seal 1600, the first surface 1904 engages the first side 1708 of the microphone PCB 1602, and the second surface 1906 engages the second side 1710 of the microphone PCB 1602.

Figure 20:
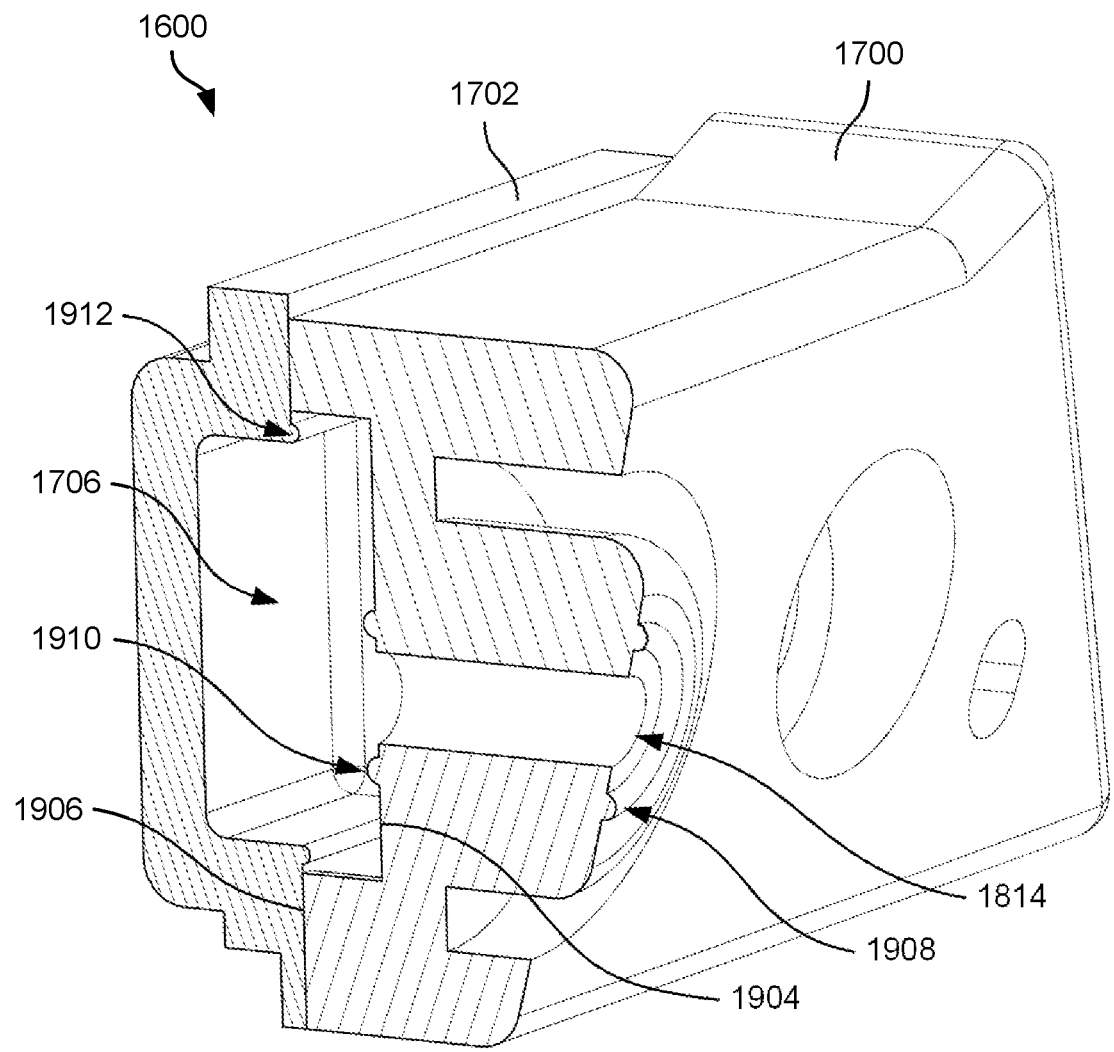
FIG. 20 illustrates a cross-sectional view of the seal of FIGS. 18A-18F, taken along line D-D of FIG. 18E, according to an example of the present disclosure.

FIG. 20 illustrates a cross-sectional view of the seal 1600, taken along line D-D of FIG. 18E, according to examples of the present disclosure. Introduced above, the seal 1600 includes the first portion 1700 and the second portion 1702 that define the microphone cavity 1706, via the first part 1900 and the second part 1902, respectively. As shown, in the folded state, sections of the first portion 1700 and the second portion 1702 may seal together to enclose the microphone cavity 1706. The first portion 1700 also includes the first ring-shaped extrusion 1908 on the front 1800, the second ring-shaped extrusion 1910 for engaging with the first side 1708 of the microphone PCB 1602, and the second portion 1702 includes the third ring-shaped extrusion 1912 for engaging with the second side 1710 of the microphone PCB 1602.

Figure 21A:
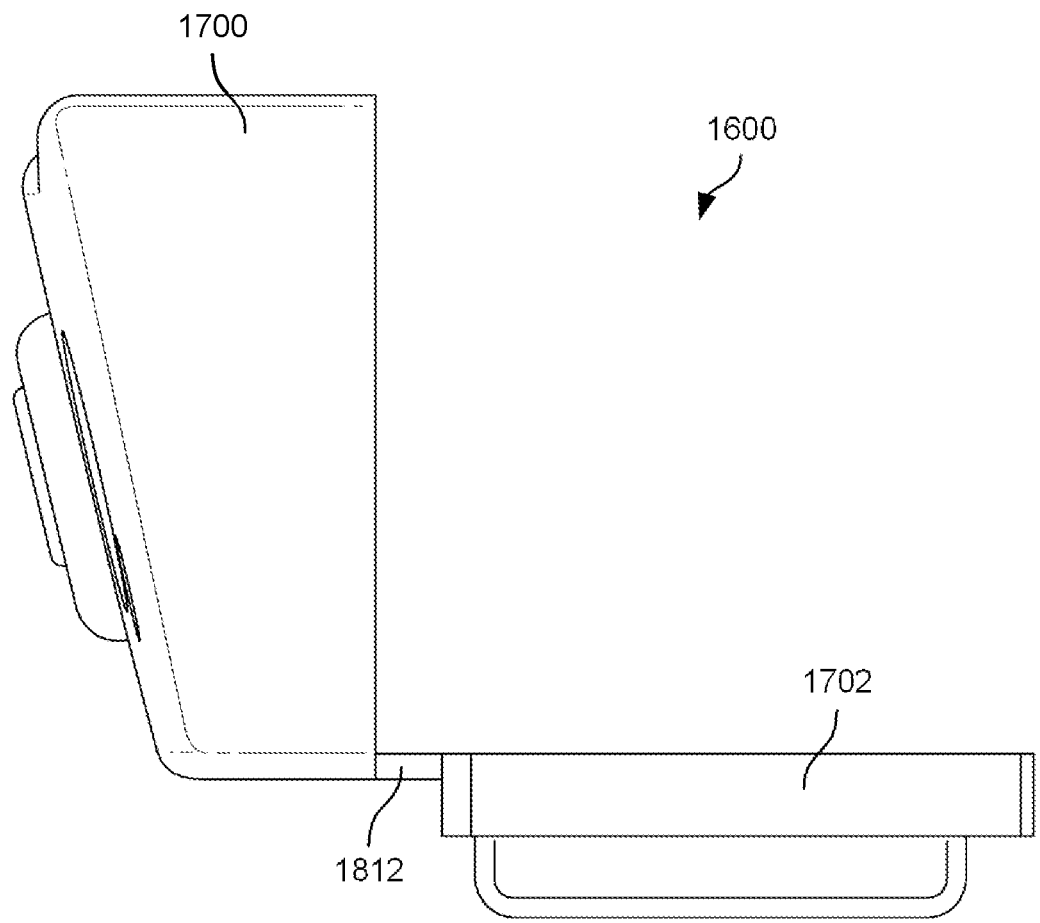
FIGS. 21A and 21B illustrate the seal of FIGS. 18A-18F, showing the seal in an unfolded state, according to an example of the present disclosure.
Figure 21B:
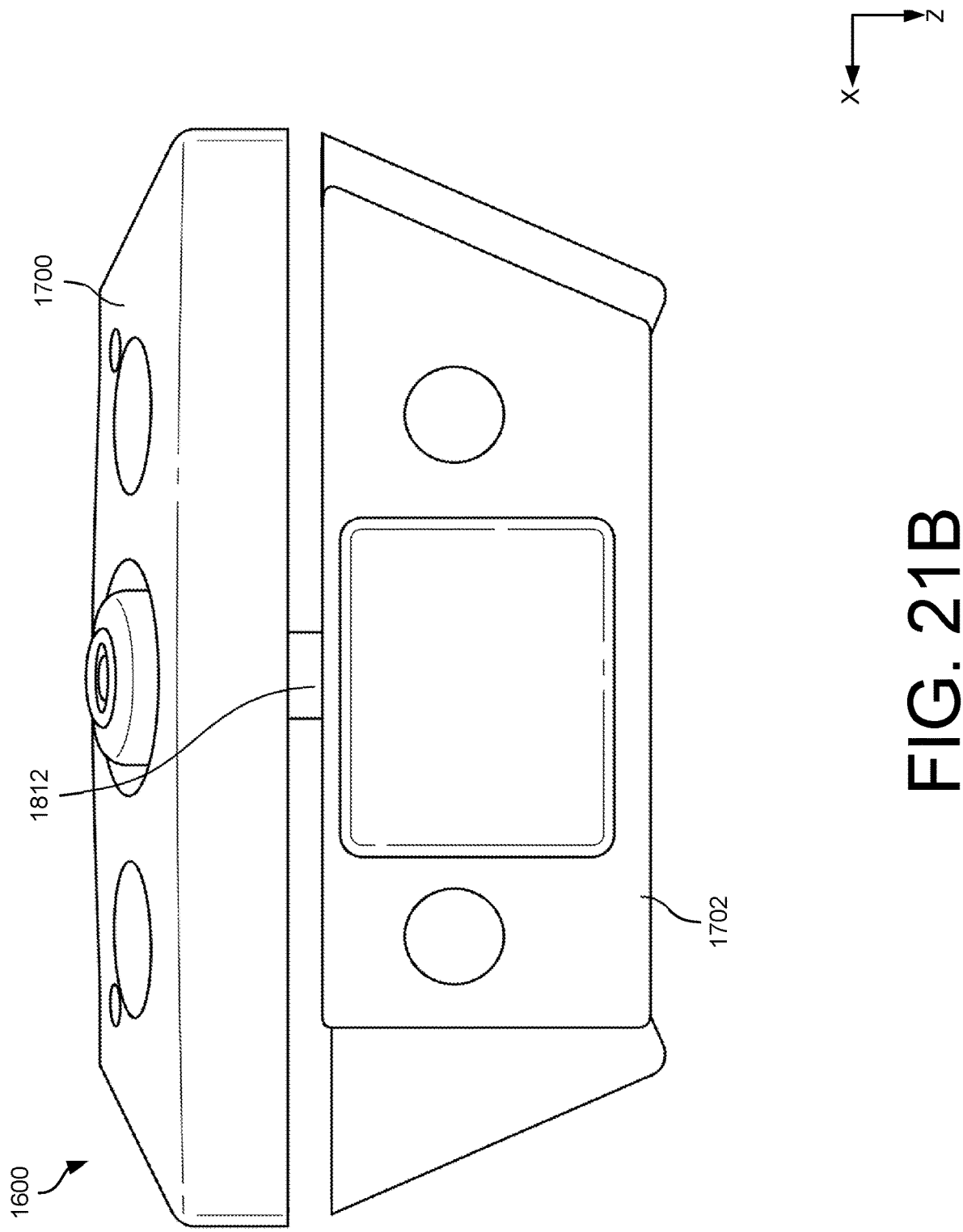

FIGS. 21A and 21B illustrate the seal 1600 in an unfolded state, according to examples of the present disclosure. FIG. 21A illustrates a side view of the seal 1600, such as the second side 1810, while FIG. 21B illustrates a bottom view of the seal 1600.

From the folded state of the seal 1600, the second portion 1702 may be rotated in a direction away from first portion 1700 (e.g., about the X-axis). For example, in the view shown in FIG. 21A, the second portion 1702 may be rotated in a first direction (e.g., clockwise about the X-axis) to the unfolded state. The second portion 1702 may be rotated in a second direction (e.g., counterclockwise about the X-axis) to the folded state. The flap 1812 maintains a coupling between the first portion 1700 and the second portion 1702 between the folded state and the unfolded state.

In the unfolded state, the microphone PCB 1602 (including the microphone 1704), may be placed within the microphone cavity 1706. In some instances, the microphone PCB 1602 may be placed within the first part 1900 of the microphone cavity 1706 or the second part 1902 of the microphone cavity 1706. Thereafter, the seal 1600 may be brought together in the folded state via moving the first portion 1700 and the second portion 1702. In doing so, the microphone PCB 1602 may become interposed between the first portion 1700 and the second portion 1702.

Figure 22A:
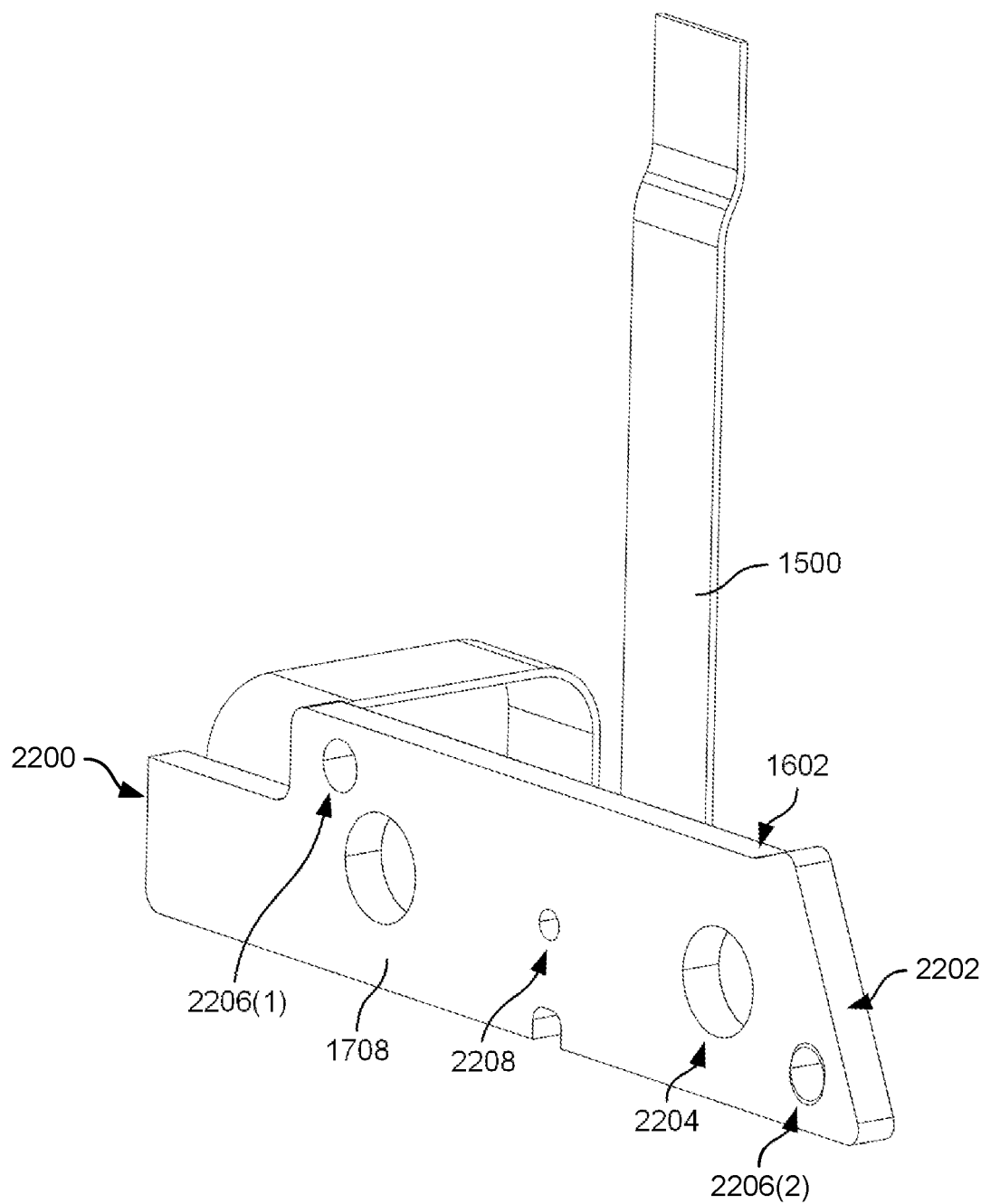
FIGS. 22A-22C illustrate an example PCB and flexible printed circuit (FPC) of the microphone assembly of FIGS. 16A and 16B, according to an example of the present disclosure.
Figure 22B:
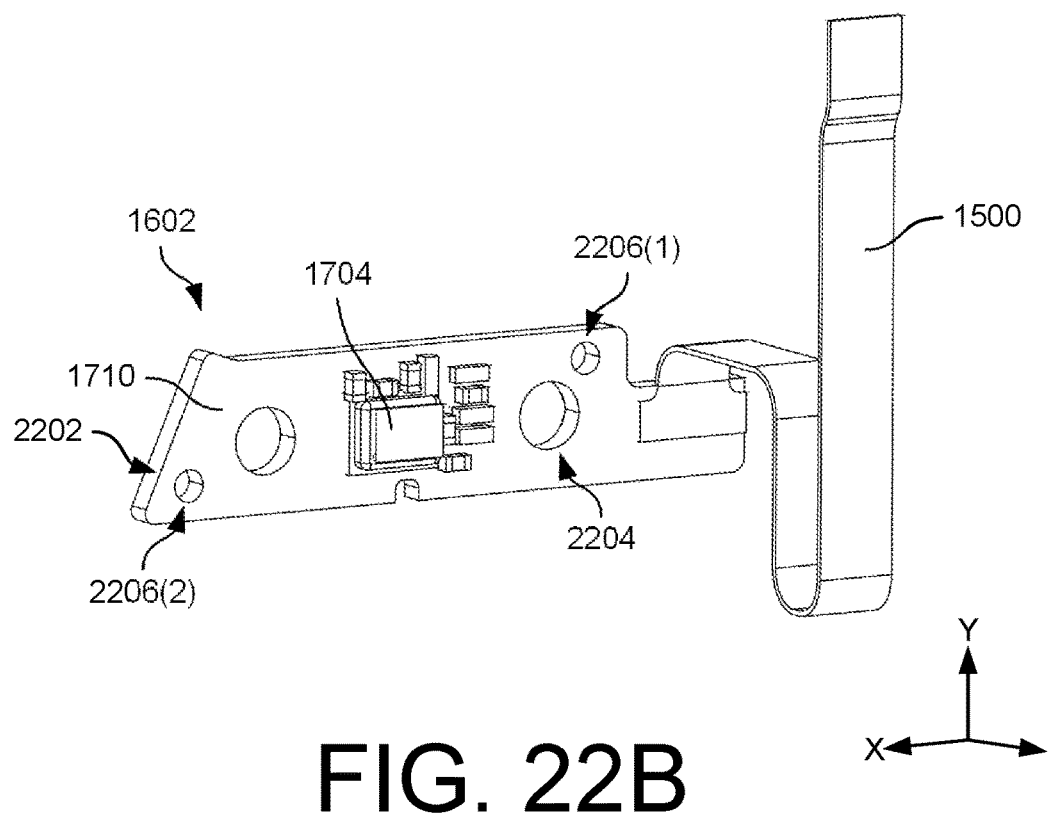
Figure 22C:
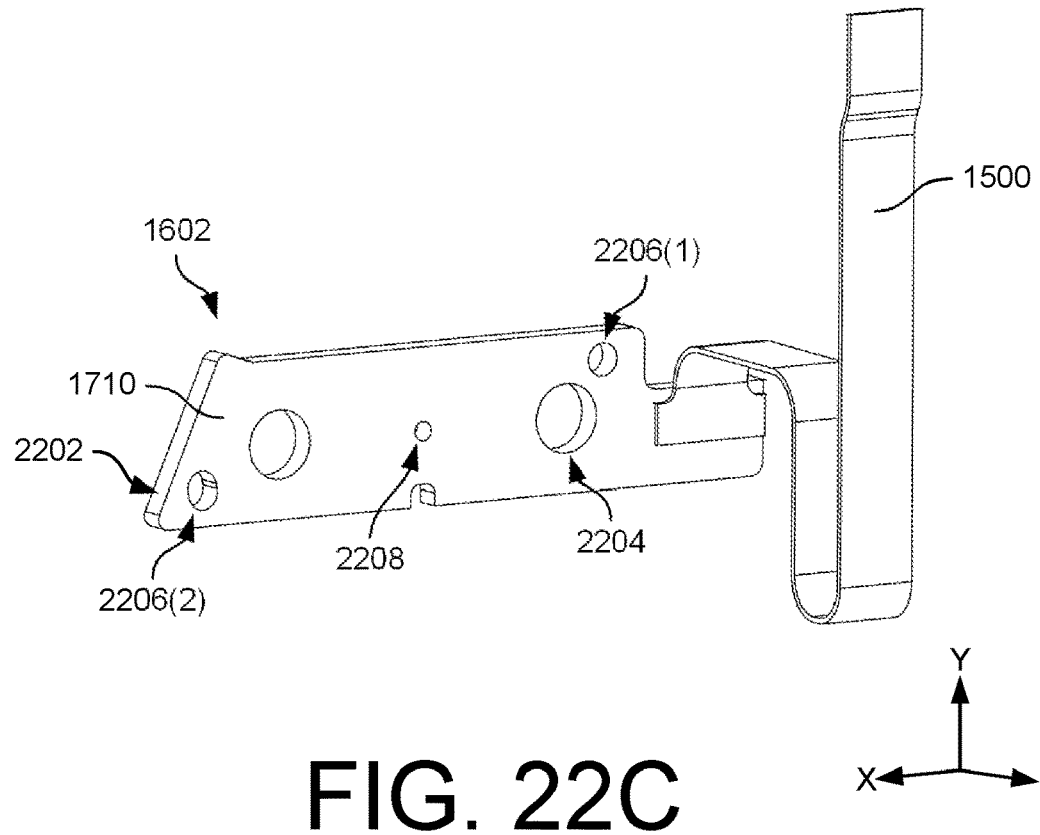

FIGS. 22A-22C illustrate the microphone PCB 1602 and the FPC 1500, according to examples of the present disclosure. FIG. 22A illustrates a front perspective view of the microphone PCB 1602 and the FPC 1500, FIG. 22B illustrates a rear perspective view of the microphone PCB 1602 and the FPC 1500, and FIG. 22C illustrates a rear perspective view of the microphone PCB 1602 and the FPC 1500, showing the microphone 1704 removed from the microphone PCB 1602.

The microphone PCB 1602 may include a first end 2200 and a second end 2202 spaced apart from the first end 2200 (e.g., in the X-direction). In addition, the microphone PCB 1602 includes the first side 1708 and the second side 1710. In some instances, the first end 2200 may receive, or couple to, the FPC 1500. When coupled to the seal 1600, the first end 2200 may be disposed external to the seal 1600 (or the microphone cavity 1706). Comparatively, the second end 2202 may be disposed internal to the seal 1600 (or the microphone cavity 1706).

The microphone PCB 1602 may include third passageways 2204 that align with the first passageways 1818 and the second passageways 1820. For example, two of the third passageways 2204 may be disposed through the microphone PCB 1602, between the first side 1708 and the second side 1710, such that fastener(s) may be disposed therethrough, respectively. Additionally, microphone PCB 1602 may include holes 2206, such as a first hole 2206(1) and a second hole 2206(2) that receive the prongs 924 disposed on the front cover 102. The first hole 2206(1) may align with the first hole 1828(1) of the seal 1600 (e.g., disposed through the first portion 1700, and the second hole 2206(2) may align with the second hole 1828(2) of the seal 1600 (e.g., disposed through the first portion 1700). In doing so, the prongs 924 that extend from the interior surface 922 of the front cover 102 may be disposed through the first hole 1828(1), the second hole 1828(2), the first hole 2206(1), and the second hole 2206(2) for securing the microphone PCB 1602 (and the microphone assembly 722) to the device 100.

The microphone PCB 1602 further defines a channel 2208. For example, being as the microphone 1704 may be disposed on the second side 1710 of the microphone PCB 1602 (as shown in FIG. 22B), the channel 2208 may permit sound to reach the microphone 1400. FIG. 22C illustrates the microphone 1704 being removed to illustrate the channel 2208 that extends through a thickness (e.g., in the Z-direction) of the microphone PCB 1602. The FPC 1500 may further couple to the second side 1710 of the microphone PCB 1602.

Figure 23:
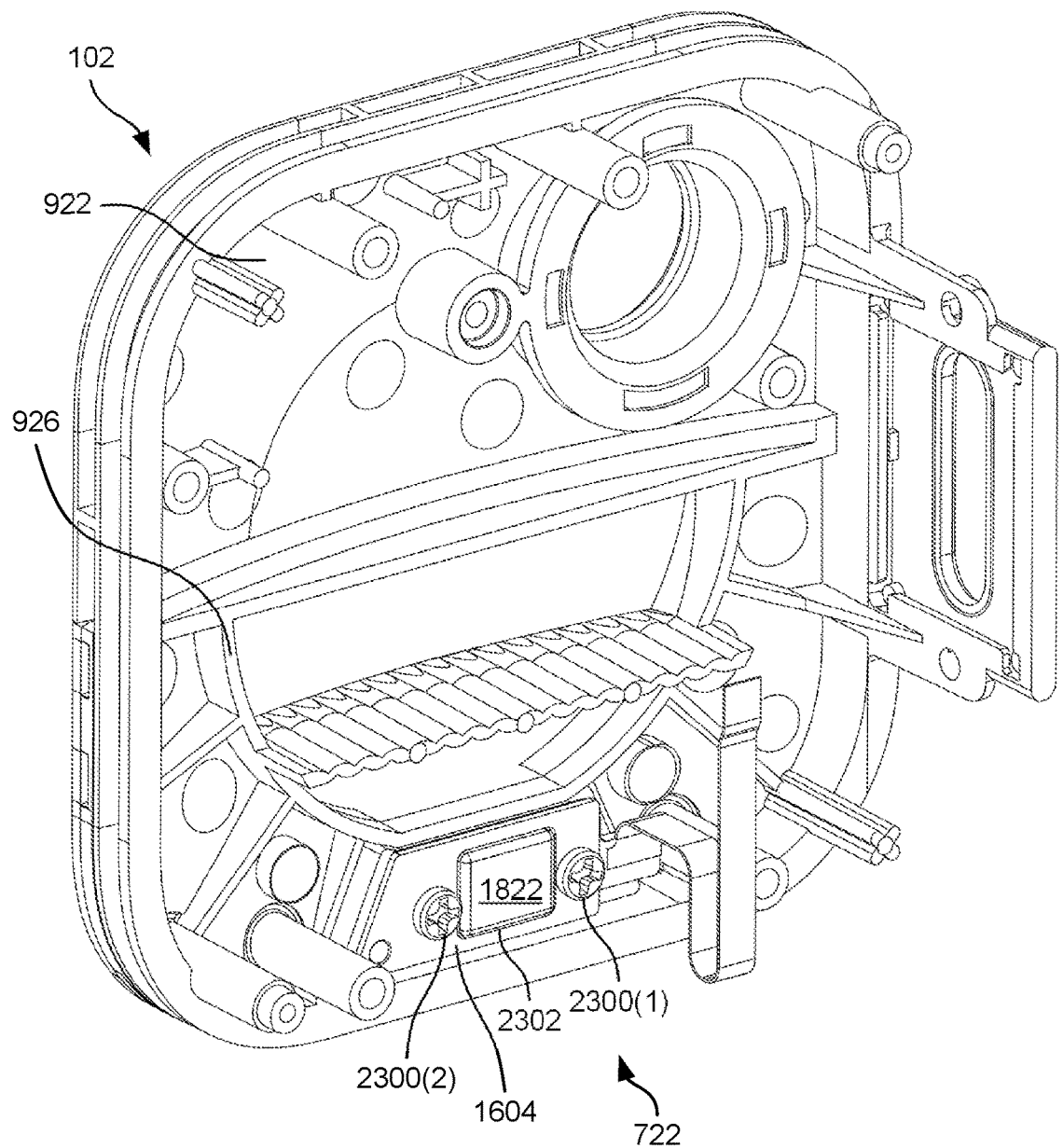
FIG. 23 illustrates the microphone assembly of FIGS. 16A and 16B coupled to the front cover of FIGS. 9A-9C, according to an example of the present disclosure.

FIG. 23 illustrates the microphone assembly 722 coupled to the front cover 102, according to examples of the present disclosure. In some instances, fastener(s) 2300 are used to couple the microphone assembly 722 to the front cover 102. For example, a first fastener 2300(1) may be disposed through a first of the first passageways 1818 and a first of the second passageways 1820, and/or a second fastener 2300(2) may be disposed through a second of the first passageways 1818 and a second of the second passageways 1820. Therein, the fastener(s) 2300 may be tightened to secure the microphone assembly 722 to the front cover 102. In FIG. 23, the bracket 1604 is shown including a cutout 2302 within which the pocket 1822 is at least partially disposed.

As part of coupling the microphone assembly 722 to the front cover 102, the prongs 924 of the front cover 102 may be disposed through the first hole 1828(1) and the second hole 2206(1), as well as the second hole 1828(2) and the second hole 2206(2). Additionally, the first tab 1826(1) and the second tab 1826(2) may engage with the flange 926 disposed around the window 800.

Figure 24A:
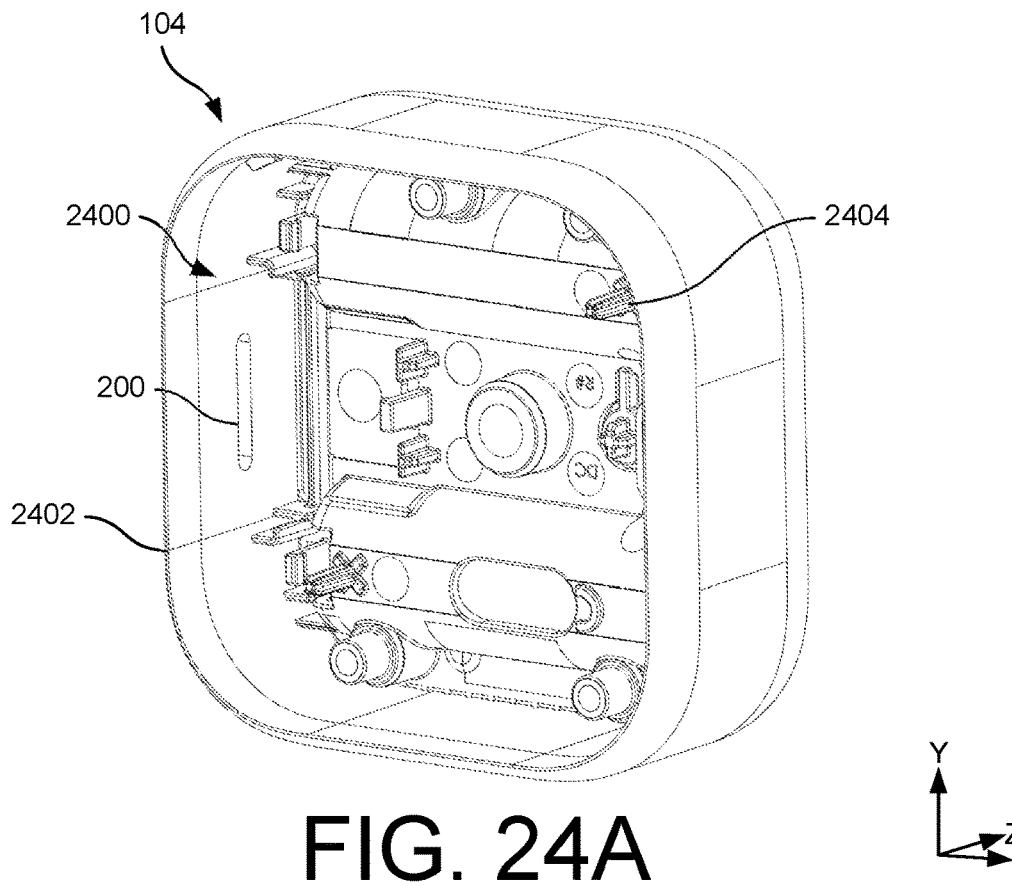
FIGS. 24A and 24B illustrate an example housing of the device of FIG. 1, according to an example of the present disclosure.
Figure 24B:
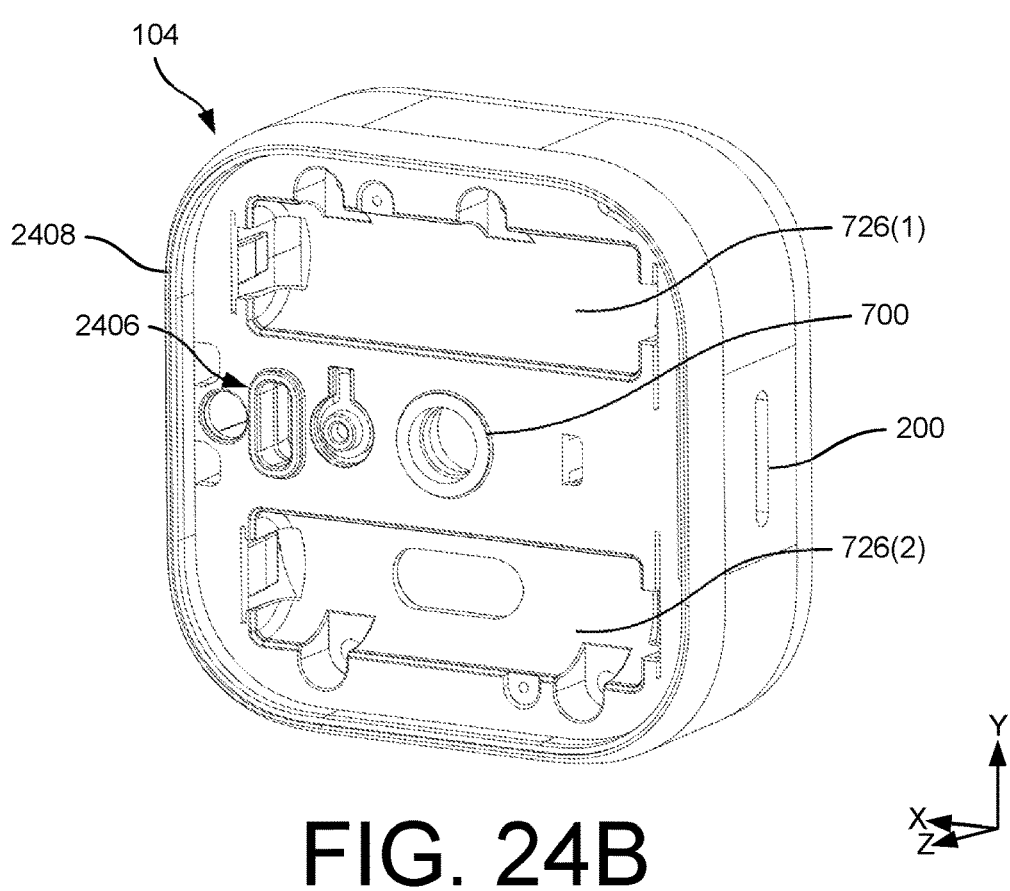

FIGS. 24A and 24B illustrate the housing 104, according to examples of the present disclosure. FIG. 24A illustrates a first end view of the housing 104 (e.g., oriented towards the front 112), and FIG. 24B illustrates a second end view of the housing 104 (e.g., oriented towards the back 114).

The housing 104 defines an interior 2400 that is sized and configured to receive the first PCB 704, the second PCB 706, the camera 1002, the speaker 1100, and so forth. For example, the first PCB 704, the second PCB 706, the camera 1002, the speaker 1100, and so forth may be inserted into the interior 2400 via a first annulus 2402. The interior 2400 may include various mounting posts, flanges, etc. for receiving the components of the device 100. For example, the housing 104 may include posts 2404 that are received within the channel 1208 and/or the channels 1504 for aligning the first PCB 704 and the second PCB 706 within the housing 104.

The housing 104 defines the first battery receptacle 726(1) and the second battery receptacle 726(2) that receive the first battery 724(1) and the second battery 724(2), respectively. A slot 2406 extends through the housing 104 for accommodating the input port 1308 disposed on the second side 1302 of the second PCB 706. Additionally, the housing 104 includes the receptacle 700 for receiving the fastening mechanism 202, and which is used to secure the rear cover 126 to the housing 104.

In some instances, the rear cover 126 is received at least partially within the second annulus 2408. The front cover 102 may be at least partially inserted into the first annulus 2402 to couple to the housing 104, and the rear cover 126 may be at least partially inserted into the second annulus 2408 to couple to the housing 104.

Figure 25A:
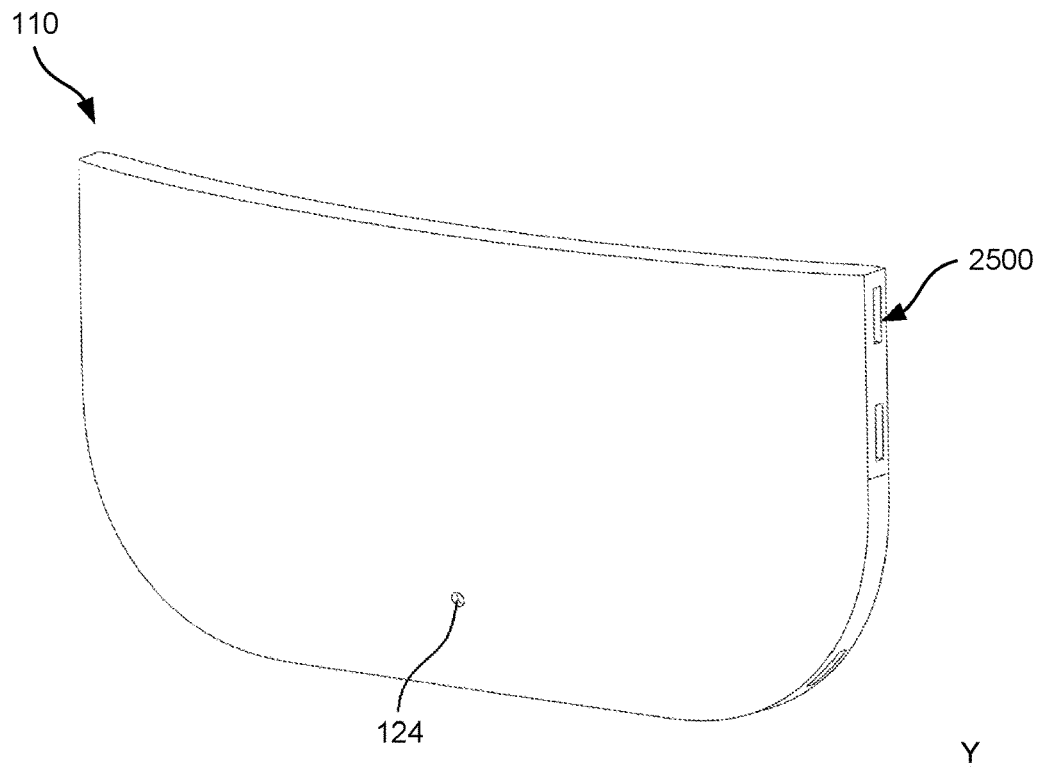
FIGS. 25A and 25B illustrate an example sensor lens of the device of FIG. 1 that couples to the front cover of FIGS. 9A-9C, according to an example of the present disclosure.
Figure 25B:
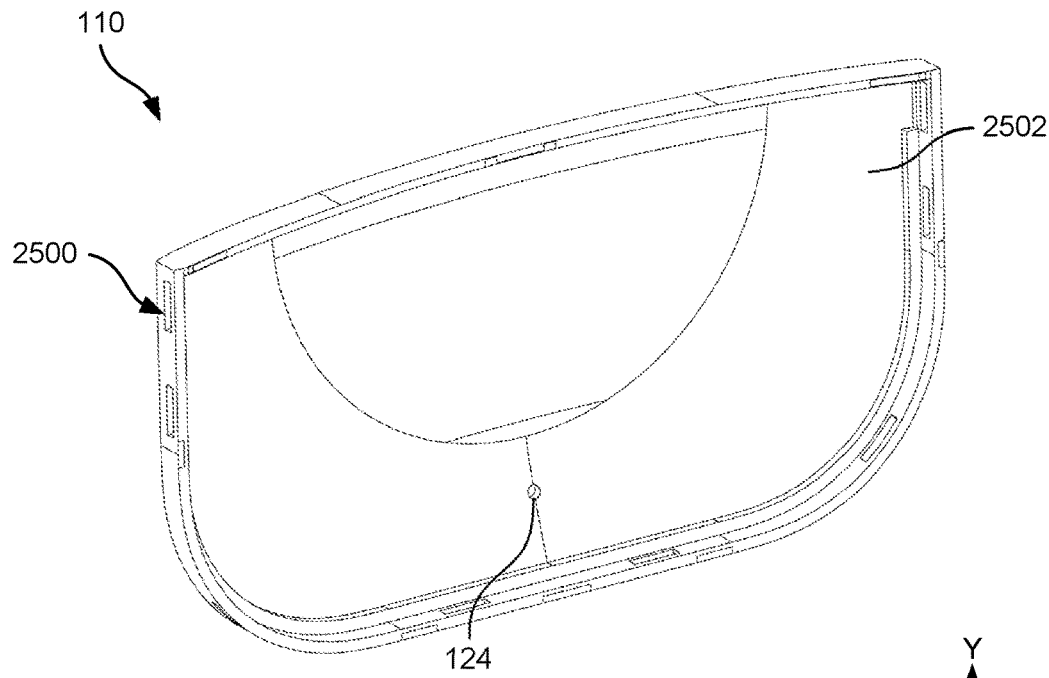

FIGS. 25A and 25B illustrate the sensor lens 110, according to examples of the present disclosure. FIG. 25A illustrates a front perspective view of the sensor lens 110, and FIG. 25B illustrates a rear perspective view of the sensor lens 110.

The sensor lens 110 is configured to couple to the front cover 102. For example, as introduced above, the front cover 102 may include the first attachment mechanisms 920 that engage with corresponding second attachment mechanisms 2500 of the sensor lens 110. In some instances, the second attachment mechanisms 2500 of the sensor lens 110 may resemble slots, keyways, and the like that engage with the first attachment mechanisms 920 of the front cover 102 (e.g., tabs, prongs, flanges, etc.). The first attachment mechanisms 920 and the second attachment mechanisms 2500 may snap together, slide together, or press fit together. In some instances, the second attachment mechanisms 2500 may be disposed at least partially around a perimeter or periphery of the sensor lens 110. In some instances, adhesives or fasteners may also be used to secure the front cover 102 and the sensor lens 110 together. Seals and/or gaskets may also be disposed at an interface between the front cover 102 and the sensor lens 110. In some instances, once coupled to the front cover 102, the sensor lens 110 may reside within the first annulus 2402.

The sensor lens 110 further defines the channel 124 for channeling sounding to the microphone 1704. Given that the first PIR sensor 718(1) and the second PIR sensor 718(2) reside beneath the sensor lens 110, the sensor lens 110 is made of a material that permits light rays (e.g., radiation) to be received by the first PIR sensor 718(1) and the second PIR sensor 718(2), respectively. An example material may include HDPE.

In some instances, an interior surface 2502 of the sensor lens 110 includes a Fresnel lens that directs light to the first PIR sensor 718(1) and the second PIR sensor 718(2). The Fresnel lens may be made up of a plurality of individual lens elements having concentric grooves, such as the facets and translation edges, that form an Fresnel lens array. For example, the concentric grooves may be etched, milled, cut, molded, or otherwise formed within the rearward surface.

Figure 26:
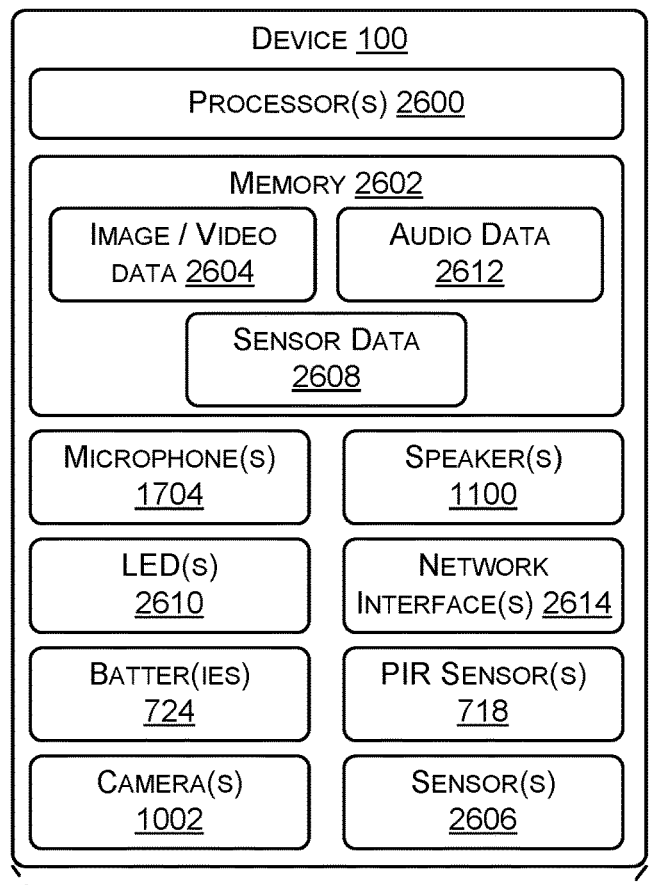
FIG. 26 illustrates select component of the device of FIG. 1, according to an example of the present disclosure.
Figure 26:
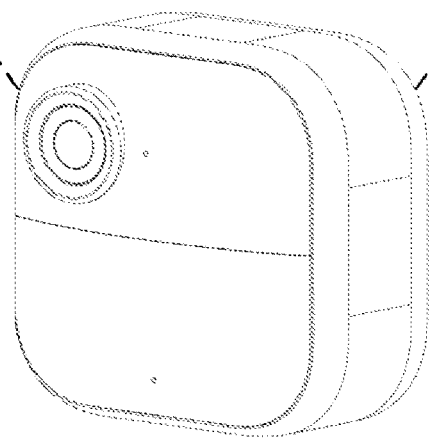

FIG. 26 illustrates select components of the device 100, according to examples of the present disclosure. The device 100 is shown including processor(s) 2600 and memory 2602, where the processor(s) 2600 may perform various functions associated with controlling an operation of the device 100, and the memory 2602 may store instructions executable by the processor(s) 2600 to perform the operations described herein.

The device 100 includes the camera(s) 1002 for capturing image/video data 2604 within an environment of the device 100. In some instances, the camera(s) 1002 may include red, green, blue, depth (RGBD) camera(s) and/or three-dimensional (3D) sensors. Additionally, the device 100 may include any other sensor(s) 2606 (e.g., ambient light sensor) that generates sensor data 2608. Further, the device 100 may include the PIR sensor(s) 718 that generates the sensor data 2608. In some instances, the PIR sensor(s) 718 act as motion sensors for detecting movement within a field of view of the PIR sensor(s) 718. The PIR sensor(s) 718 may be secured on or within a PIR frame that may reside behind a sensor lens 110 (e.g., a Fresnel lens) of the device 100. In such examples, the PIR sensor(s) 718 may detect IR radiation in a field of view of the PIR sensor(s) 718, and produce an output signal (e.g., voltage) that changes as the amount of IR radiation in the field of view changes. The amount of voltage in the output signal may be compared, by the processor(s) 2600, for example, to one or more threshold voltage values to determine if the amount of voltage in the output signal is indicative of motion, and/or if the amount of voltage in the output signal is indicative of motion of an entity that is to be recorded by the camera(s) 1002. In some instances, the PIR sensor(s) 718 may detect the motion for activating the camera(s) 1002 and/or the microphone(s) 1704 to begin capturing image data and/or audio data, respectively.

In some instances, the PIR sensor(s) 718 are used to detection motion within an environment of the device 100. However, in some instances, the camera(s) 1002, in addition to or alternative from the PIR sensor(s) 718, may be used to detect motion. For example, computer vision techniques may be used to detect objects of interest. In some instances, the camera(s) 1002 may include a CMOS image sensor, and a digital processor that may perform embedded processing within the low-power CVM itself, such that the low-power CVM may output post-processed computer vision metadata to the processor(s) 3600. The metadata may include information such as the presence of a particular type of entity (e.g., person, animal, vehicle, parcel, etc.), a direction of movement of the entity, a distance of the entity from the device 100, etc. As a result of including the computer vision, the device 100 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image.

The device 100 also includes LED(s) 2610, such as IR LEDs and/or white LEDs, for illuminating and/or emitting light within the environment of the device 100. Any number of IR LEDs and/or white LEDs may be included, and the IR LEDs and the white LEDs may be arranged about various sides of the device 100 (e.g., front, sides, etc.). In some instances, in response to the PIR sensor(s) 718 and/or the camera(s) 1002 detecting motion, the LED(s) 2610 may receive an output signal from the processor(s) 2600 that causes the LED(s) 2610 to activate the one or more lights. The IR LEDs may also be used to detect motion and/or record image/video data 2604 in low-light conditions. The LED(s) 2610 may also output indications associated with an operational status of the device 100.

The device 100 includes the microphone(s) 1704 that generate(s) audio data 2612. Speaker(s) 1100 may output sound in a direction away from the device 100. The sound output by the speaker(s) 1100 may include the audio data 2612, which may be received from one or more communicatively coupled device, or other audio (e.g., siren, alarm, etc.).

Network interface(s) 2614 permit the device 100 to communicate over one or more networks. Example network interface(s) 2614 include, without limitation, Wi-Fi, Bluetooth, ZigBee, Bluetooth Low Energy (BLE), LTE, and so forth. The network interface(s) 2614 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5 fiber optic cable, etc.), a wireless infrastructure (e.g., RF, cellular, microwave, satellite, Bluetooth, etc.), and/or other connection technologies.

In some instances, inbound data from may be routed through the network interface(s) 2614 before being directed to the processor(s) 2600, and outbound data from the processor(s) 2600 may be routed through the network interface (s) 2614. The network interface(s) 2614 may therefore receive inputs, such as data, from the processor(s) 2600, the camera(s) 1002, the PIR sensor(s) 718, and so forth. For example, the network interface(s) 2614 may be configured to transmit data to and/or receive data from one or more network devices. The network interface(s) 2614 may act as a conduit for data communicated between various components and the processor(s) 2600.

Battery(ies) 724 may power the components of the device 100. Any number of battery(ies) 724 may be included, and the battery(ies) 724 may be rechargeable/replaceable. Additionally, the device 100 may be powered using a source of external AC (alternating-current) power, such as mains power. When the battery(ies) 724 are depleted, the battery (ies) 724 may be recharged by connecting a power source to the battery(ies) 3000 (e.g., using a USB connector).

Although certain components of the device 100 are illustrated, it is to be understood that the device 100 may include additional or alternative components. For example, the device 100 may include other input/output devices (e.g., display screen), heat dissipating elements, computing components (e.g., PCBs), antennas, ports (e.g., USB), and so forth).

As used herein, a processor, such as the processor(s) 2600 may include multiple processors and/or a processor having multiple cores. Further, the processor(s) may comprise one or more cores of different types. For example, the processor (s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 2602 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device, comprising:
   a camera;
   a cover including a first channel defined therethrough; a seal including:
      a first portion having a second channel defined therethrough, a
      second portion, and
      a flexible portion coupling the first portion and the second portion,
   a printed circuit board (PCB) at least partially disposed within a cavity at least partially defined by the first portion of the seal and the second portion of the seal; and
   a microphone enclosed within the cavity and electronically coupled to the PCB, wherein
   the first channel is aligned with the second channel.

2. The device of claim 1, wherein the PCB comprises a third channel defined therethrough, and wherein the third channel is aligned with the first channel and the second channel.

3. The device of claim 2, further comprising a lens coupled to the cover, the lens including a fourth channel, wherein the first channel, the second channel, the third channel, and the fourth channel are aligned to direct sound towards the microphone.

4. The device of claim 1, wherein:
   the PCB includes a first end and a second end opposite the first end; the
   first end is disposed within the cavity; and
   the second end is disposed external to the cavity.

5. The device of claim 1, wherein:
   the PCB includes a first side and a second side;
   the first side is oriented towards a front of the device;
   the second side is oriented towards a rear of the device; and the microphone is disposed on the second side.

6. The device of claim 1, wherein the PCB comprises a first PCB, further comprising:
   a second PCB;
   a third PCB;
   a lighting element disposed on the second PCB;
   an infrared (IR) sensor disposed on the second PCB; and
   one or more passive infrared (PIR) sensors disposed on the third PCB.

7. The device of claim 1, wherein the cover further incudes a fourth channel, and wherein the device further comprises a lighting element configured to emit light via the fourth channel.

8. The device of claim 1, further comprising a speaker coupled to the cover, the speaker being oriented in a first direction, wherein the camera is oriented in a second direction that is different than the first direction.

9. The device of claim 1, wherein: the cover includes a window having:
   a first section, a second section, and a divider separating the first section and the second section; and
   device further includes:
   a first passive infrared (PIR) sensor is oriented towards the first section, and
   a second PIR sensor is oriented towards the second section.

10. The device of claim 1, wherein the first portion, the second portion, and the flexible portion are each a portion of a single integral component.

11. The device of claim 1, wherein the first portion and the second portion are flexible.

12. The device of claim 1, wherein the seal comprises silicon, silicone, or rubber.

13. The device of claim 1, wherein the seal encapsulates the microphone within the cavity.

14. The device of claim 1, wherein the PCB comprises a third channel defined therethrough, the third channel is aligned with the first channel and the second channel, and the microphone is disposed between the PCB and the second portion.

15. The device of claim 1, wherein the device comprises a video doorbell.

16. The device of claim 1, wherein the device further comprises a passive infrared sensor, a visible-light light emitting diode, an infrared light emitting diode, and a button.

17. A device comprising:
   a housing;
   a cover coupled to the housing, the cover including a first channel;
   a seal disposed at least partially within the housing, the seal including:
      a first portion having a second channel aligned with the first channel, a
      second portion at least partially defining a cavity, and
      a third portion disposed between the first portion and the second portion; and
   a printed circuit board (PCB) at least partially enclosed by the seal, the PCB including:
      a third channel aligned with the second channel, and
      a microphone disposed at least partially within the cavity, the microphone configured to receive sound via the first channel, the second channel, and the third channel.

18. The device of claim 17, further comprising a lens coupled to the cover, the lens including a fourth channel aligned with the first channel.

19. The device of claim 17, wherein:
   the first portion of the seal defines a first part of the cavity;
   the second portion of the seal defines a second part of the cavity; the PCB includes:
      a first side,
      a second side opposite the first side, a
      first end, and a second end opposite the first end;
the third channel extends between the first side and the second side; the
microphone is disposed on the second side of the PCB;
the first end is disposed within the seal; and the
second end is disposed external to the seal.

20. The device of claim 17, wherein the PCB comprises a first PCB, further comprising:
a second PCB; a
third PCB;
a lighting element disposed on the second PCB;
an infrared (IR) sensor disposed on the second PCB; and
one or more passive infrared (PIR) sensors disposed on the third PCB.

21. A device comprising:
a housing;
a cover coupled to the housing, the cover defining a first channel; and
a microphone assembly coupled to the cover, the microphone assembly including: a printed circuit board (PCB) having a microphone, and
a seal at least partially disposed around the PCB, the seal having:
a first portion defining a second channel that aligns with the first channel for directing sound to the microphone,
a second portion, and
a third portion disposed between the first portion and the second portion.

22. The device of claim 21, wherein:
the PCB includes:
a first side,
a second side, and
a third channel extending between the first side and the second side, the third channel aligning within the second channel; and
the microphone is disposed on the second side.

23. The device of claim 21, wherein the third portion hingedly couples the first portion and the second portion.

24. The device of claim 21, wherein the seal defines a cavity in which the microphone is disposed.

25. The device of claim 21, wherein the first portion, the second portion, and the third portion are each a portion of a single integral component.

* * * * *